(12) United States Patent
Nonaka

(10) Patent No.: US 7,647,428 B2
(45) Date of Patent: Jan. 12, 2010

(54) METHOD AND APPARATUS FOR EMAIL RELAY OF MOVING IMAGE CONVERSION AND TRANSMISSION, AND PROGRAMS THEREFOR

(75) Inventor: Shunichiro Nonaka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 736 days.

(21) Appl. No.: 10/828,201

(22) Filed: Apr. 21, 2004

(65) Prior Publication Data

US 2005/0021642 A1    Jan. 27, 2005

(30) Foreign Application Priority Data

May 27, 2003 (JP) ............................. 2003-149251
May 29, 2003 (JP) ............................. 2003-152709

(51) Int. Cl.
*G06F 15/16* (2006.01)
*G06K 9/36* (2006.01)
*G06K 9/46* (2006.01)

(52) U.S. Cl. ...................... 709/246; 382/232
(58) Field of Classification Search ......... 709/217–219, 709/204–207, 246; 382/232
See application file for complete search history.

(56) References Cited

U.S. PATENT DOCUMENTS

| | | | | |
|---|---|---|---|---|
| 5,557,320 A | * | 9/1996 | Krebs | 725/114 |
| 5,949,912 A | * | 9/1999 | Wu | 382/232 |
| 6,092,114 A | * | 7/2000 | Shaffer et al. | 709/232 |
| 6,148,108 A | * | 11/2000 | Nishikawa | 382/232 |
| 6,310,962 B1 | * | 10/2001 | Chung et al. | 382/232 |
| 6,345,279 B1 | * | 2/2002 | Li et al. | 709/217 |
| 6,571,015 B1 | * | 5/2003 | Matsuo et al. | 382/232 |
| 7,313,602 B2 | * | 12/2007 | Ono et al. | 709/219 |
| 2001/0044814 A1 | * | 11/2001 | Itani et al. | 707/530 |
| 2001/0051979 A1 | * | 12/2001 | Aufricht et al. | 709/203 |
| 2002/0129002 A1 | * | 9/2002 | Alberts et al. | 707/1 |
| 2003/0028647 A1 | * | 2/2003 | Grosu | 709/227 |
| 2003/0050062 A1 | | 3/2003 | Chen et al. | |

(Continued)

FOREIGN PATENT DOCUMENTS

EP    1 081 619 A2    3/2001

(Continued)

OTHER PUBLICATIONS

Kuroki, N. and Numa, M., "Fast Dithering Technique for MPEG Viewer with a 256-Color Mode", T. IEE Japan, vol. 120-C, No. 11, 2000, pp. 1622-1628.

*Primary Examiner*—Benjamin R Bruckart
(74) *Attorney, Agent, or Firm*—Birch, Stewart, Kolasch & Birch, LLP

(57) ABSTRACT

Even if an email attached with a moving image is sent to a terminal that is not capable of moving image display, pseudo moving image display can be carried out in high quality on the terminal. An email reception unit receives the email, and a model judgment unit judges the model of the terminal as a destination of the email. If the destination terminal cannot display the moving image, a moving image conversion unit generates a multimedia image data in a multimedia format from moving image data representing the moving image. An image attaching unit attaches the moving mage data or the multimedia image data to main content of the email, and an email transmission unit sends the image-attached email to the destination terminal.

4 Claims, 21 Drawing Sheets

U.S. PATENT DOCUMENTS

| | | | |
|---|---|---|---|
| 2003/0093565 A1* | 5/2003 | Berger et al. | 709/246 |
| 2003/0120840 A1* | 6/2003 | Isozu | 710/36 |
| 2003/0126214 A1* | 7/2003 | Oliszewski | 709/206 |
| 2003/0130894 A1* | 7/2003 | Huettner et al. | 705/14 |
| 2003/0158777 A1* | 8/2003 | Schiff et al. | 705/14 |
| 2003/0208546 A1* | 11/2003 | DeSalvo et al. | 709/206 |
| 2003/0221100 A1* | 11/2003 | Russ et al. | 713/153 |
| 2004/0009766 A1* | 1/2004 | Hong | 455/422.1 |
| 2004/0015589 A1* | 1/2004 | Isozu | 709/227 |
| 2004/0039801 A9* | 2/2004 | Srinivasan et al. | 709/221 |
| 2004/0044781 A1* | 3/2004 | Hymel et al. | 709/229 |
| 2004/0199906 A1* | 10/2004 | McKnight et al. | 717/136 |
| 2004/0225752 A1* | 11/2004 | O'Neil et al. | 709/246 |

FOREIGN PATENT DOCUMENTS

| | | |
|---|---|---|
| JP | 11168498 A | 6/1999 |
| JP | 11205860 | 7/1999 |
| JP | 11-259640 A1 | 9/1999 |
| JP | 2000-023191 | 1/2000 |
| JP | 2001217860 | 8/2001 |
| JP | 2002-244971 A1 | 8/2002 |
| KR | 10-2004-0047099 A | 6/2004 |
| WO | WO 02/089486 A2 | 11/2002 |
| WO | WO 03/005276 A2 | 1/2003 |
| WO | WO 03/013080 A1 | 3/2003 |

* cited by examiner

| MODELS | ABILITY OR INABILITY TO DISPLAY MOVING IMAGE | ABILITY OR INABILITY TO DISPLAY MULTIMEDIA IMAGE | SCREEN SIZE | NUMBER OF DISPLAYABLE COLORS | NUMBER OF FRAMES IN REDUCED-COLOR MOVING IMAGE | DATA SIZE (KB) |
|---|---|---|---|---|---|---|
| A001 | × | ○ | 120x130 | 4096 | 5 | 20 |
| A002 | ○ | ○ | 120x130 | 65536 | 10 | 20 |
| B001 | ○ | ○ | 176x164 | 262144 | 12 | 20 |
| B002 | ○ | × | 132x142 | 262144 | 12 | 20 |
| C001 | × | × | 120x130 | 65536 | 5 | 10 |
| C002 | ○ | ○ | 132x160 | 262144 | 10 | 20 |
| C003 | ○ | × | 132x136 | 65536 | 10 | 20 |
| D001 | × | × | 160x198 | 65536 | 7 | 10 |
| D002 | × | × | 128x128 | 65536 | 7 | 10 |

METHOD AND APPARATUS FOR EMAIL RELAY OF MOVING IMAGE CONVERSION AND TRANSMISSION, AND PROGRAMS THEREFOR

This Nonprovisional application claims priority under 35 U.S.C. § 119(a) on Patent Application No(s). 2003-149251 and 2003-152709, both filed in Japan on May 27, 2003 and May 29, 2003, respectively, the entire contents of which are hereby incorporated by reference.

BACKGROUND OF THE INVENTION

1. Field of the Invention

The present invention relates to an email relay apparatus and an email relay method for relaying an email attached with a moving image to a destination. The present invention also relates to a program causing a computer to execute the email relay method.

2. Description of the Related Art

An image obtained by a digital camera, a scanner, or the like can represent 24-bit colors (that is, approximately 16.77 million colors) wherein 8 bits each are assigned to R, G, and B. However, some reproduction apparatus are capable of reproducing fewer colors such as 256 colors. Furthermore, an image format used frequently in Web sites (such as GIF or PNG) can deal with only 256 colors. Therefore, for displaying an image obtained by a digital camera or the like on a reproduction apparatus which can display fewer colors, or for converting the image into an image format such as GIF or PNG, the 16.77 million colors need to be reduced to 256 colors.

In conventional color reduction processing, palette data comprising 256 palette colors are generated for optimally representing the image to be displayed, and one of the 256 palette colors is selected from the palette data for color conversion on each pixel. In this manner, the colors in the image are reduced to the 256 colors.

Moreover, a method of generating a moving image has been proposed in Japanese Unexamined Patent Publication No. 11(1999)-259640. In this method, a moving image obtained by a digital camcorder is subjected to real-time color reduction processing, and an image having motion caused by serially changing still images (hereinafter referred to as a reduced-color moving image) is generated. In this method, frames that change at every 1/60 of a second in the moving image are subjected to the real-time color reduction processing without being skipped. Therefore, palette data are generated for every several frames instead of each frame, and the color reduction processing is carried out by using the palette data for the several frames.

Meanwhile, functions of mobile terminals such as camera-embedded mobile phones have improved remarkably, and a communication speed is also rising. Therefore, a mobile terminal has been realized that is capable of photographing a moving image, transmitting the moving image by attaching the image to an email, and reproducing desired moving image content by downloading the moving image content through access to a moving image transmission server.

In addition, an email relay server has also been proposed that can carry out appropriate image processing in accordance with the type of a terminal as a receiver of an email attached with a still image sent from a camera-embedded mobile phone (Japanese Patent Application No. 2002-214215). By using such an email relay server, the image processing can be carried out on image data to cause the image to be appropriate for a size, brightness, and colors of a display screen of the terminal, and the image data are sent to the terminal by being attached to the email.

Another system has also been proposed for sending image data (Japanese Unexamined Patent Publication No. 2002-244971). In this system, image data in accordance with models of mobile terminals are stored in an image server corresponding to a Web site, and the model of a mobile terminal that accesses the Web site is judged. The image data corresponding to the judged model are then sent to the mobile terminal.

Meanwhile, following a recent increase in the number of pixels in a display screen of a mobile terminal, a mobile terminal having a display screen that is 2×2 (in other words, 4) times larger in the number of pixels in horizontal and vertical directions is on the market. If an image appropriate for the number of pixels in such a display screen of a mobile terminal is used, the image can be displayed on the mobile terminal in higher definition.

Furthermore, in the case where an email attached with a moving image is sent to a mobile terminal, the moving image can surely be displayed thereon if the terminal is capable of moving image display. However, there are some models of mobile terminals that cannot display a moving image. Therefore, even if an email attached with a moving image having been subjected to appropriate image processing in accordance with the model of a mobile terminal as a receiver is sent to the mobile terminal, the moving image may not be displayed thereon. In this case, the moving image can be converted into a reduced-color moving image as has been described above, and sent to the mobile terminal as the receiver.

Meanwhile, regardless of an increase in the number of pixels in a display screen, capacity of a memory installed in a mobile terminal for image display is not large due to high cost or the like. For example, although the number of pixels in a display screen has achieved a fourfold increase, memory capacity has only been doubled.

In addition, a format of a reduced-color moving image such as GIF and PNG uses a compression method considering one-dimensional redundancy (that is, redundancy in only one direction of an image). Therefore, although a compression ratio can be improved in the case where pixels having the same value are aligned in one direction, the compression ratio cannot be increased for a direction orthogonal thereto.

For this reason, in the case where a reduced-color moving image of a reduced-color moving image format is sent and displayed on a display screen of a mobile terminal having a large number of pixels (hereinafter referred to as a high-resolution display screen), a data size of the image after compression can only be doubled although the number of pixels therein can be quadrupled, for example. Therefore, the data size of the image in the reduced-color moving image format needs to be decreased by degrading image quality, decreasing frames in the image to be displayed, or lowering resolution, for example. However, since the image of the reduced-color moving image format originally has only 256 displayable colors, quality of the image displayed on the mobile terminal is substantially degraded by the data size reduction despite that the mobile terminal can carry out high-definition image display.

SUMMARY OF THE INVENTION

The present invention has been conceived based on consideration of the above circumstances. An object of the present invention is therefore to enable high-quality image display wherein frames are continuously displayed one by one as in a reduced-color moving image even in the case where an email attached with a moving image is sent to a mobile terminal that is not capable of displaying the moving image.

Another object of the present invention is to enable pseudo moving image display even in the case where an email attached with a moving image is sent to a mobile terminal that is not capable of displaying the moving image.

A first email relay apparatus of the present invention is an apparatus for sending an email attached with a moving image to a terminal as a destination of the email, and the first email relay apparatus comprises:

model judgment means for judging a model of the terminal; and moving image conversion means for converting the moving image into a multimedia image in a multimedia format in the case where the model of the terminal is not capable of moving image display but enables multimedia image display. The first email relay apparatus then sends the multimedia image instead of the moving image to the terminal.

The multimedia image in the multimedia format refers to an image in a format that enables interactive serial display of frames while causing the frames to synchronize with sound. For example, Flash™ developed by Macromedia, Inc. can be used for generating the multimedia image, which is not necessarily limited thereto. An image in a format that does not cause the image to synchronize with sound is included in the multimedia image of the multimedia format.

A Flash™ movie is a vector graphic animation to be displayed on the Web, and combines sound and animation of vector graphics. A file format called SWF is used in a Flash™ movie, and a Flash™ movie realizes interactive display of a graphic animation such as figures, photographs, and the like represented by vectors on a display screen in synchronization with sound. By using Flash™, the multimedia image wherein the frames are continuously reproduced one by one can be generated.

A Flash™ movie can deal with a reduced-color moving image in a format such as GIF or PNG. However, in the present invention, the frames are preferably compressed in a method such as JPEG that considers redundancy in two dimensions, rather than a method such as GIF or PNG that considers redundancy in only one dimension.

Sending the multimedia image instead of the moving image to the terminal refers to the case of sending the multimedia image instead of the moving image by attaching the multimedia image to the email if the terminal can receive the email without separation of the image attached thereto, and to the case of sending information (such as URL) representing where the multimedia image is temporarily stored to the terminal by attaching the information to the email while temporarily storing the multimedia image and sending later the multimedia image to the terminal in response to an instruction sent from the terminal, if the terminal cannot receive the email without separation of the image attached thereto.

In the first email relay apparatus of the present invention, the moving image conversion means may comprise:

sampling means for sampling the frames from the moving image; and multimedia image generation means for generating the multimedia image by compressing the frames according to the compression method considering two-dimensional redundancy.

In this case, the multimedia image generation means of the first email relay apparatus of the present invention may generate the multimedia image in such a manner that it can be displayed on a display device of the terminal in accordance with a characteristic of the display device.

The characteristic of the display device refers to resolution of the display device, a data size that can be dealt with by the display device, and the number of colors that can be reproduced by the display device, for example.

Generating the multimedia image in such a manner that it can be displayed on the display device refers to generating the multimedia image in such a manner that the image can be displayed on the display device without any processing by the display device. More specifically, the number of the frames in the multimedia image, a display interval between the frames, a size of display, the number of colors to be displayed, a data size of the multimedia image, and a data size after decompression need to agree with the characteristic of the display device so that no processing is necessary for the display device.

The multimedia image generation means may comprise:

size change means for enlarging or reducing the frames according to the characteristic of the display device;

frame compression means for compressing the frames by the compression method considering two-dimensional redundancy so that the data size of the multimedia image can be dealt with by the display device; and format compilation means for generating the multimedia image by compiling the frames compressed by the frame compression means into the multimedia format.

In the case where the multimedia image does not have the data size that can be dealt with by the display device, the frame compression means may repeat changing of a compression ratio of the frames and/or thinning of the frames until the data size of the multimedia image becomes the data size that can be dealt with by the display device.

In the first email relay apparatus of the present invention, the terminal may be a mobile terminal.

A first email relay method of the present invention is a method of sending an email attached with a moving image to a terminal as a destination of the email. The first email relay method comprises the steps of:

judging a model of the terminal;

converting the moving image into a multimedia image in a multimedia format in the case where the model of the terminal is not capable of moving image display but enables multimedia image display; and sending the multimedia image instead of the moving image to the terminal.

The first email relay method of the present invention may be provided as a program executed by a computer. A computer readable storage medium may have a computer executable program stored thereon.

According to the first email relay apparatus and the first email relay method of the present invention, the model of the terminal as the destination of the email attached with the moving image is judged first, and moving image is converted into the multimedia image in the case where the model does not allow display of the moving image but can deal with the multimedia image in the multimedia format. The multimedia image is then sent to the terminal instead of the moving image. Therefore, even if the mobile terminal cannot display the moving image, the multimedia image enables pseudo display of the moving image in high quality.

A compression method considering two-dimensional redundancy can reduce the data size than a compression method considering one-dimensional redundancy while maintaining an image quality. Therefore, by sampling the frames from the moving image and compressing the frames according to the compression method that considers two-dimensional redundancy, the multimedia image in the multimedia format is generated. At this time, the frames sampled from the moving image are included in the multimedia image by being compressed in the compression method such as JPEG that considers two-dimensional redundancy instead of a compression method such as GIF or PNG considering one-dimensional redundancy as used for generating a reduced-color moving image. Therefore, the image to be displayed continuously frame by frame can be generated in high quality while the data size thereof can be made smaller than that of a reduced-color moving image. In this manner, the image can be displayed in high quality on the display device such as a terminal that has a high-resolution display screen.

In addition, by generating the multimedia image that is displayable on the display device according to the characteristic of the display device, the multimedia image can be displayed on the display device of the terminal without fail.

The frames can be enlarged or reduced according to the characteristic. The frames are then compressed according to the compression method considering two-dimensional redundancy so that the data size thereof can be dealt with by the display device, and complied to generate the multimedia image. In this manner, the multimedia image can be generated in consideration of the screen size and the data size that can be dealt with by the display device. Therefore, the multimedia image can be displayed on the display device of the terminal with more certainty.

The data size of the frames after the compression becomes different, depending on the fact that the frames represent simple images of a single color or complex images including detailed subjects, for example. The data size of the frames also becomes different after decompression, depending on the simplicity or complexity of the images. Therefore, the data size of the multimedia image (before and after decompression) may not become the data size that can be dealt with by the display device of the terminal in some cases, depending on how complex the frames are. In this case, by repeating procedure of the compression ratio change and/or the frame thinning until the data size can be dealt with by the display device, the multimedia image having the data size that can be dealt with by the display device of the terminal can be generated.

By using a mobile terminal as the terminal that receives the email, the multimedia image can be displayed on the mobile terminal.

A second email relay apparatus of the present invention is an apparatus for sending an email attached with a moving image to a terminal as a destination of the email, and the second email relay apparatus comprises:

model judgment means for judging a model of the terminal; and reduced-color moving image conversion means for converting the moving image into a reduced-color moving image in the case where the model is incapable of moving image display but capable of reduced-color moving image display. The second email relay apparatus then sends the reduced-color moving image instead of the moving image to the terminal.

Sending the reduced-color moving image instead of the moving image to the terminal refers to the case of sending the reduced-color moving image instead of the moving image by attaching the reduced-color moving image to the email if the terminal can receive the email without separation of the image attached thereto, and to the case of sending information (such as URL) representing where the reduced-color moving image is temporarily stored to the terminal by attaching the information to the email while temporarily storing the reduced-color moving image and sending later the reduced-color moving image to the terminal in response to an instruction sent from the terminal, if the terminal cannot receive the email without separation of the image attached thereto.

In the second email relay apparatus of the present invention, the reduced-color moving image conversion means may comprise:

reference frame generation means for generating a reference frame that represents frames comprising the moving image;

palette data generation means for generating a palette data set including a predetermined number of colors from the reference frame;

frame sampling means for sampling, from the frames, reduced-color moving image generation frames to be used for generating the reduced-color moving image;

color reduction processing means for converting the reduced-color moving image generation frames into reduced-color moving image frames according to the palette data set; and frame compilation means for compiling the reduced-color moving image from the reduced-color moving image frames.

In the second email relay apparatus of the present invention, the reference frame generation means may generate the reference frame from all or a part of the frames comprising the moving image.

As the part of the frames, the reduced-color moving image generation frames may be used.

A second email relay method of the present invention is a method of sending an email attached with a moving image to a terminal as a destination of the email, and the second email relay method comprises the steps of:

judging a model of the terminal;

converting the moving image into a reduced-color moving image in the case where the model is not capable of moving image display but is capable of reduced-color moving image display; and sending the reduced-color moving image instead of the moving image to the terminal.

The second email relay method of the present invention may be provided as a program executed by a computer. A computer readable storage medium may have a computer executable program stored thereon.

According to the second email relay apparatus and the second email relay method of the present invention, the model of the terminal as the destination of the email attached with the moving image is judged first, and the moving image is converted into the reduced-color moving image and sent to the terminal instead of the moving image in the case where the model does not allow display of the moving image but can deal with the reduced-color moving image. Therefore, even if the terminal cannot display the moving image, pseudo moving image display can be realized based on the reduced-color moving image.

Furthermore, the reference frame representing the frames comprising the original moving image is generated, and the palette data set including the predetermined number of colors is generated from the reference frame. The reduced-color moving image generation frames are then sampled from the frames, and converted into the reduced-color moving image frames by using the palette data set. The reduced-color moving image frames are compiled into the reduced-color moving image. Therefore, by generating the reduced-color moving image in the above-described manner, the palette data set does not need to be generated for every several frames as in the case of the method described in Japanese Unexamined Patent Publication No. 11(1999)-259640. The only palette data set is generated and used for obtaining the reduced-color moving image from the moving image. Consequently, the reduced-color moving image can be generated without increasing a size of the apparatus.

By generating the reference frame from all or the part of the frames comprising the original moving image, the palette data set can be generated for reflecting colors of all or the part of the frames. Therefore, the reduced-color moving image can be generated without a substantial change of the colors in the original moving image.

BRIEF DESCRIPTION OF THE DRAWINGS

FIG. 2 is a table representing a relationship between models and formats;

DESCRIPTION OF THE PREFERRED EMBODIMENTS

Figure 1:
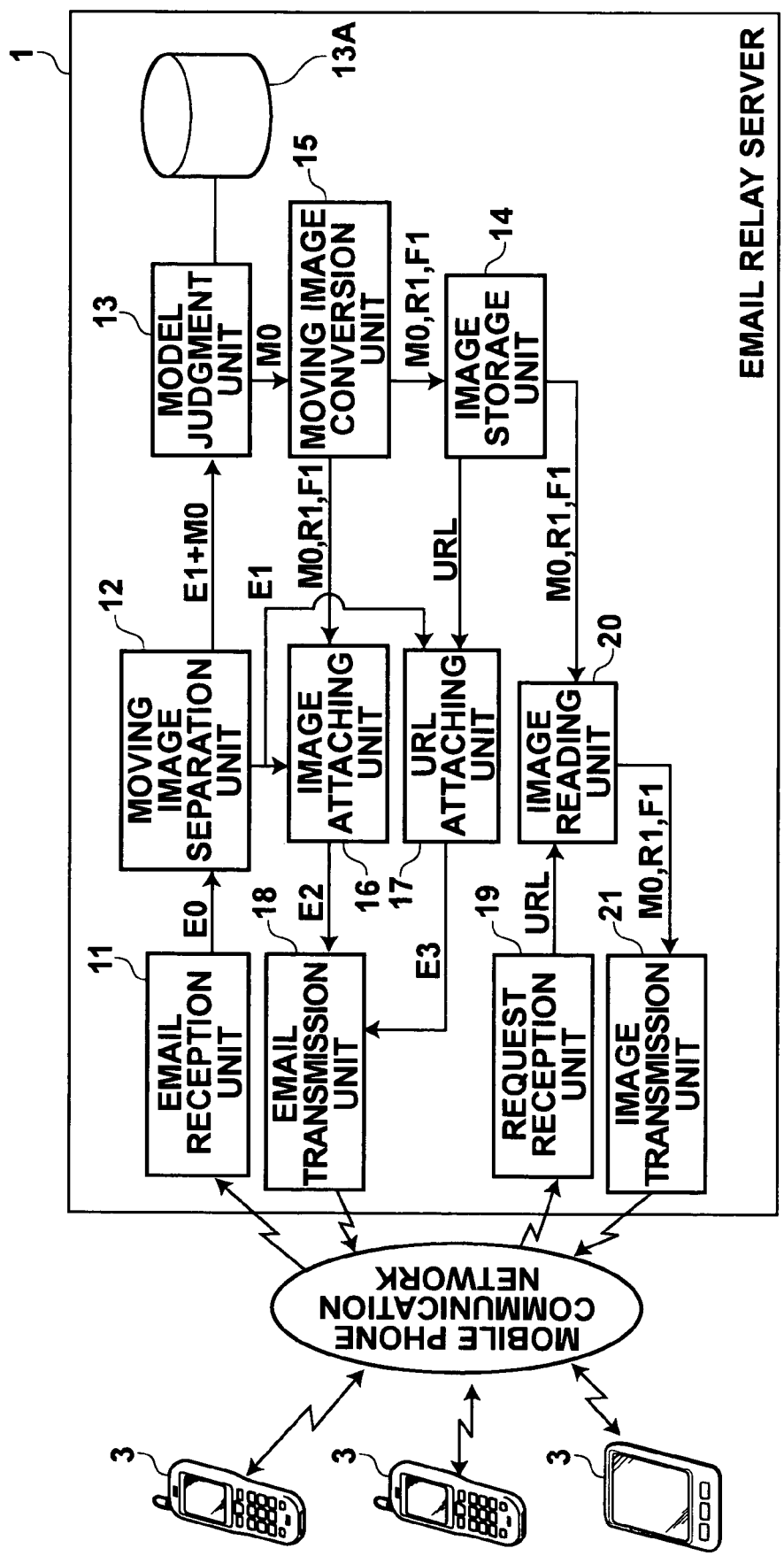
FIG. 1 is a block diagram showing a configuration of an email system using an email relay server adopting an email relay apparatus of a first embodiment of the present invention.

Hereinafter, embodiments of the present invention will be explained with reference to the accompanying drawings. FIG. 1 is a block diagram showing a configuration of an email system using an email relay server adopting an email relay apparatus of a first embodiment of the present invention. As shown in FIG. 1, the email system in the first embodiment comprises an email relay server 1 that relays an email attached with a moving image sent from one of terminals 3 such as mobile phones, PHS, or PDA embedded with a camera that can record the moving image through photography (hereinafter referred to as a sender terminal 3), to another one of the terminals 3 as a destination of the email (hereinafter referred to as a destination terminal 3).

The email relay server 1 comprises an email reception unit 11, a moving image separation unit 12, a model judgment unit 13, an image storage unit 14, a moving image conversion unit 15, an image attaching unit 16, a URL attaching unit 17, an email transmission unit 18, a request reception unit 19, an image reading unit 20, and an image transmission unit 21.

The email reception unit 11 receives an email E0 attached with a moving image data set M0 representing the moving image sent from the sender terminal 3.

The moving image separation unit 12 separates the moving image data set M0 from the email E0, and obtains main content E1 comprising information of the email E0 excluding the moving image data set M0. The main content E1 comprises a message and a header including various kinds of information such as a sender email address and a destination email address. The moving image separation unit 12 inputs the main content E1 and the moving image data set M0 to the model judgment unit 13.

The model judgment unit 13 judges whether or not the destination terminal 3 can carry out moving image display, based on the destination email address included in the header of the main content E1, while referring to a database 13A relating the destination email address with the model of the destination terminal 3 and to a table representing a relationship between models and formats. The model judgment unit 13 also judges whether or not the destination terminal 3 can receive the image-attached email without separating the image attached thereto.

FIG. 2 is a table representing the relationship between formats and models. In the case where the terminal 3 is a mobile phone, a table T1 in FIG. 2 shows ability or inability to carry out moving image display and multimedia image display, a screen size, the number of colors displayable thereon, the number of frames displayable in a reduced-color moving image, and a data size that can be dealt with (in KB), regarding each of the models of the mobile phone (such as A001, A002, and B001)

A result of the judgment by the model judgment unit 13 is one of four cases shown below:

(1) The destination terminal 3 can carry out moving image display and can receive the image-attached email without separation of the image attached thereto.

(2) The destination terminal 3 cannot carry out moving image display but can receive the image-attached email without separation of the image attached thereto.

(3) The destination terminal 3 can carry out moving image display but cannot receive the image-attached email without separation of the image attached thereto.

(4) The destination terminal 3 cannot carry out moving image display and cannot receive the image-attached email without separation of the image attached thereto.

In the case where the result of the judgment corresponds to the case (1), the model judgment unit 13 inputs the moving image data set M0 to the image attaching unit 16 without processing by the moving image conversion unit 15. The moving image separation unit 12 inputs the main content E1 to the image attaching unit 16.

If the result corresponds to the case (2), the model judgment unit 13 inputs the moving image data set M0 to the moving image conversion unit 15, and causes the moving image conversion unit 15 to process the moving image data set M0. The moving image separation unit 12 inputs the main content E1 to the image attaching unit 16.

In the case where the result is the case (3) described above, the model judgment unit 13 inputs the moving image data set M0 to the image storage unit 14 without the processing by the moving image conversion unit 15. The moving image separation unit 12 inputs the main content E1 to the URL attaching unit 17.

If the result is the case (4), the model judgment unit 13 inputs the moving image data set M0 to the moving image conversion unit 15, and causes the moving image conversion unit to process the moving image data set M0. The moving image separation unit 12 inputs the main content E1 to the URL attaching unit 17.

The image storage unit 14 stores the moving image data set M0 and a multimedia image data set F or a reduced-color moving image data set R1 that is generated by the moving image conversion unit 15.

The moving image conversion unit 15 judges whether or not the destination terminal 3 can carry out multimedia image display in the case where the destination terminal 3 cannot carry out moving image display. If a result of this judgment is affirmative, the moving image conversion unit 15 converts the moving image data set M0 into the multimedia image data set F1. If the result is negative, the moving image conversion unit 15 converts the moving image data set M0 into the reduced-color moving image data set R1.

Figure 3:
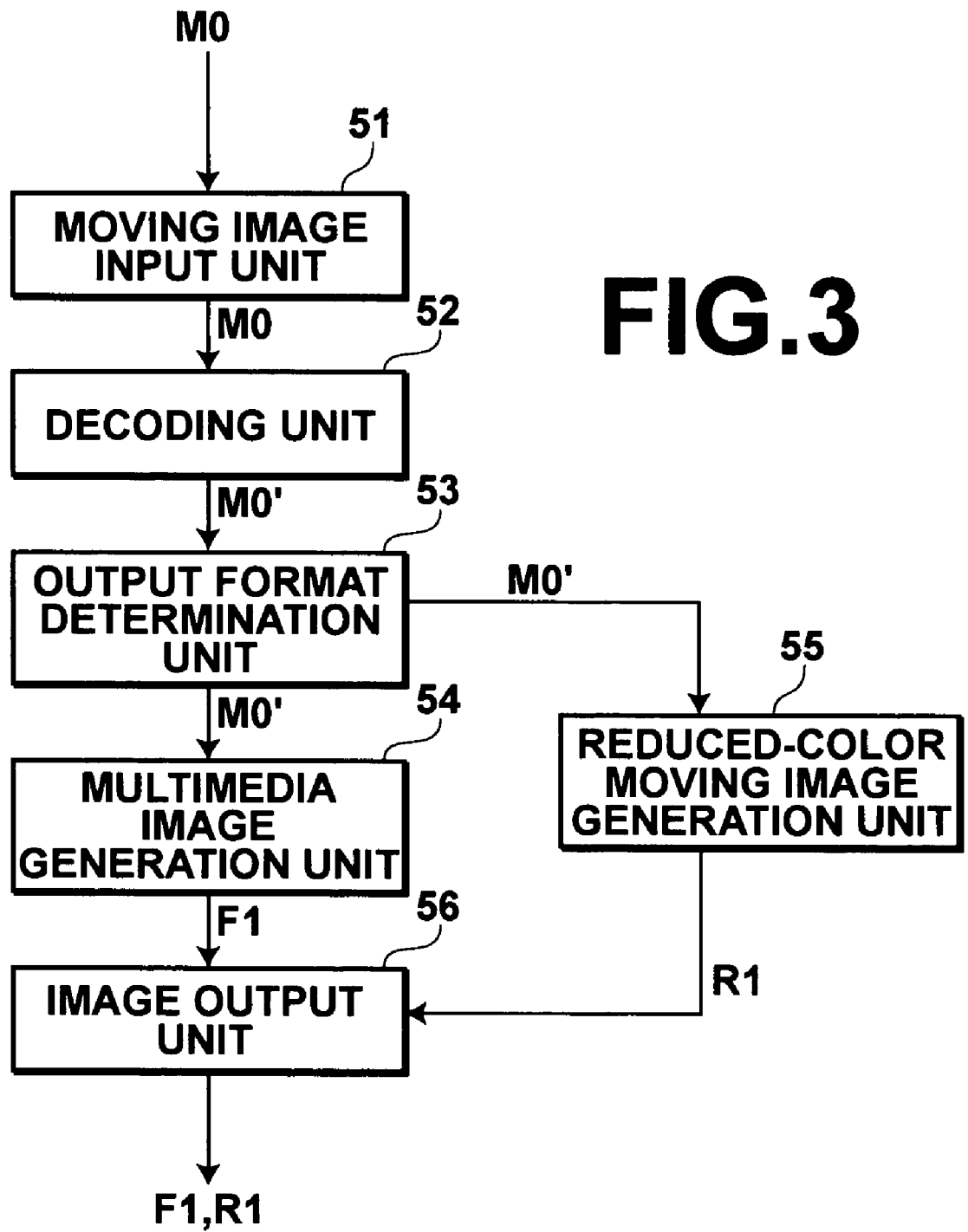
FIG. 3 is a block diagram showing a configuration of a moving image conversion unit.

FIG. 3 is a block diagram showing a configuration of the moving image conversion unit 15. As shown in FIG. 3, the moving image conversion unit 15 comprises a moving image input unit 51, a decoding unit 52, an output format determination unit 53, a multimedia image generation unit 54, a reduced-color moving image generation unit 55, and an image output unit 56.

The moving image input unit 51 receives an input of the moving image data set M0 thereto.

The decoding unit 52 decodes the moving image data set M0 that is encoded, and generates a raw moving image data set M0'.

By referring to the table T1, the output format determination unit 53 inputs the raw moving image data set M0' to the multimedia image generation unit 54 in the case where the destination terminal 3 can carry out multimedia image display. Otherwise, the output format determination unit 53 inputs the raw moving image data set M0' to the reduced-color moving image generation unit 55.

Figure 4:
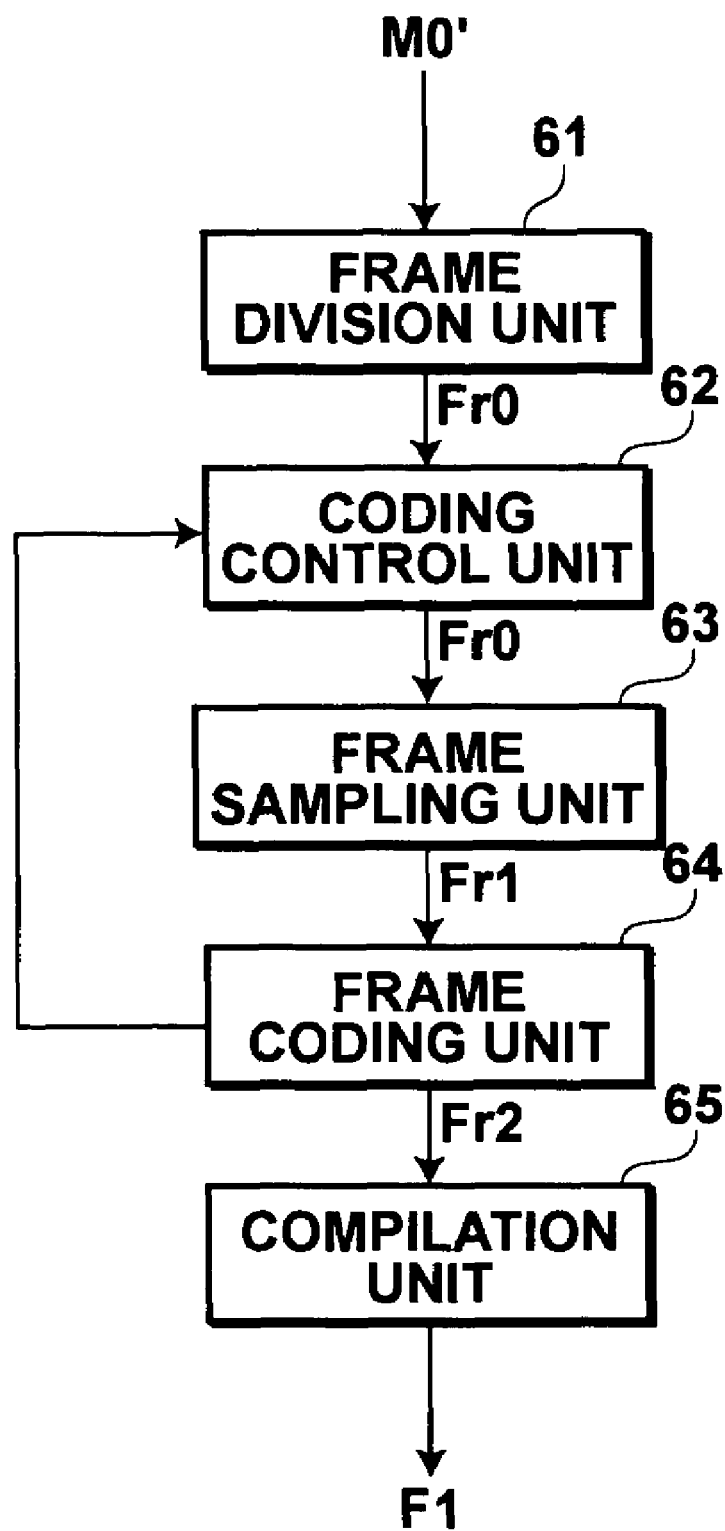
FIG. 4 is a block diagram showing a configuration of a multimedia image generation unit.

The multimedia image generation unit 54 generates the multimedia image data set F1 from the raw moving image data set M0'. FIG. 4 is a block diagram showing a configuration of the multimedia image generation unit 54 in detail. As shown in FIG. 4, the multimedia image generation unit 54 comprises a frame division unit 61, a coding control unit 62, a frame sampling unit 63, a frame coding unit 64, and a compilation unit 65.

The frame division unit 61 divides the raw moving image data set M0' into image data sets of respective frames (hereinafter referred to as frame data sets Fr0). In this embodiment, 1 frame represents a part of the moving image displayed for $\frac{1}{60}$ of a second, for example.

The coding control unit 62 controls the frame sampling unit 63 and the frame coding unit 64 so that a data size of the multimedia image data set F1 can be equal to or smaller than a data size that can be dealt with by a display device of the destination terminal 3 (hereinafter referred to as a data size K). The data size K refers to both a data size K1 at the time of dealing with image data in compression and a data size K2 at the time of dealing with image data after decompression.

The frame sampling unit 63 samples frame data sets Fr1 from the frame data sets Fr0 to cause the data size of the multimedia image data set F1 to become the data size K or smaller.

The frame coding unit 64 compresses the sampled frame data sets Fr1 according to a JPEG format that considers two-dimensional redundancy so that the data size of the multimedia image data set F1 becomes the data size K or smaller. The frame coding unit 64 obtains compressed frame data sets Fr2 in this manner. The frame coding unit 64 further judges whether the data size of the multimedia image data set F1 generated through compilation of the compressed frame data sets Fr2 by the compilation unit 65 is equal to or smaller than the data size K1. The frame coding unit 64 also judges whether the data size of the multimedia image data set F1 after decompression is equal to or smaller than the data size K2. If a result of the judgment is affirmative (that is, the data size is not larger than the data size K), the frame coding unit 64 inputs the compressed frame data sets Fr2 to the compilation unit 65. If the result is negative (that is, the data size is larger than the data size K1 or K2, or both K1 and K2), the frame coding unit 64 sends information representing this fact to the coding control unit 62. After reception of this information, the coding control unit 62 controls the frame sampling unit 63 to reduce the number of frames to be sampled, and controls the frame coding unit 64 to increase a compression ratio.

More specifically, the data size of the compressed frame data sets Fr2 becomes different, depending on whether the frames represent simple images of a single color or whether the frames represent images including detailed subjects, for example. The data size of the multimedia image data set F1 after decompression also varies, depending on the simplicity or complexity. Therefore, the data size of the multimedia image data set F1 may be larger than the data size K in some cases, depending on the complexity of the frames. Consequently, in the case where the data size of the multimedia image data set F1 generated by the compilation unit 65 is larger than the data size K, the sampling and the coding of the sampled frame data sets Fr1 are carried out again to cause the data size of the multimedia image data set F1 to become the data size K or smaller.

The compilation unit 65 generates the multimedia image data set F1 by compiling the compressed frame data sets Fr2 into a Flash™ movie. More specifically, the compilation unit 65 adds information necessary for serial display of the frames (such as information on a display interval between the frame data sets Fr2) to the respective compressed frame data sets Fr2, and arranges the compressed frame data sets Fr2. In this manner, the compressed frame data sets Fr2 are compiled into the multimedia image data set F1. In the case where sound is added to the multimedia image data set F1, the compilation unit 65 includes audio data to the multimedia image data set F1.

Figure 5:
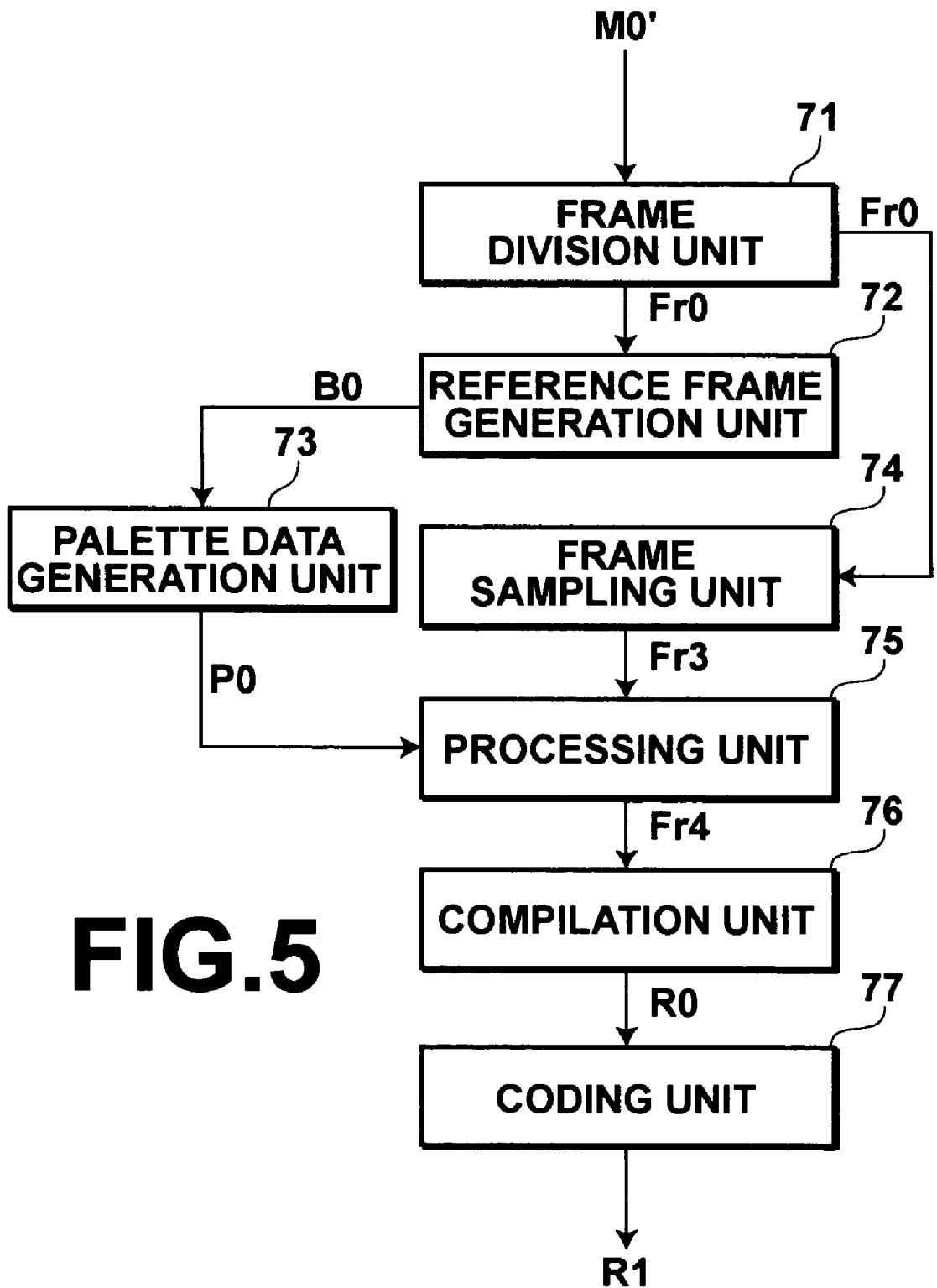
FIG. 5 is a block diagram showing a configuration of a reduced-color moving image generation unit.

The reduced-color moving image generation unit 55 in FIG. 3 converts the moving image data set M0 into the reduced-color moving image data set R1 in the case where the destination terminal 3 can carry out neither moving image display nor multimedia image display. FIG. 5 is a block diagram showing a configuration of the reduced-color moving image generation unit 55 in detail. As shown in FIG. 5, the reduced-color moving image generation unit 55 comprises a frame division unit 71, a reference frame generation unit 72, a palette data generation unit 73, a frame sampling unit 74, a processing unit 75, a compilation unit 76, and a coding unit 77.

The frame division unit 71 divides the raw moving image data set M0' into the frame data sets Fr0, as the frame division unit 61 of the multimedia image generation unit 54.

The reference frame generation unit 72 generates a reference frame data set B0 used for palette data generation from the frame data sets Fr0. The reference frame data set B0 refers to a first frame data set Fr0 that comes first in the frames when the frames are arranged in chronological order. Alternatively, any one of the frame data sets Fr0 may be used as the reference frame data set B0. Furthermore, the reference frame data set B0 may be one image data set generated by combining all of the frame data sets Fr0 or from a portion Fr0' of the frame data set Fr0 (hereinafter referred to as selected frame data sets Fr0'). Alternatively, all the frame data sets Fr0 or the selected frame data sets Fr0' may be averaged and used as the reference frame data set B0. The selected frame data sets Fr0' may be frame data sets sampled by the frame sampling unit 74 as will be explained later.

The palette data generation unit 73 generates a palette data set P0 having a predetermined number of colors that are necessary for color reduction processing from the reference frame data set B0. More specifically, the palette data set P0 can be generated according to a median cut method, but a method of palette data generation is not limited to this method.

In the median cut method, RGB color data comprising the reference frame data set B0 are plotted in a three-dimensional RGB space, and a median is found in a range where the color data exist in the space. The median is then used as one palette color comprising the palette data set P0, and the space is divided into two spaces by the median. In the divided spaces, the median is also found. By repeating the above-described procedure until the number of colors in the palette data set becomes the predetermined number (such as 256 colors), the palette colors comprising the palette data set P0 can be found.

The frame sampling unit 74 samples frame data sets Fr3 comprising the reduced-color moving image data set R1 from the frame data sets Fr0. More specifically, the frame sampling unit 74 obtains information on the number of frames in the reduced-color moving image represented by the reduced-color moving image data set R1 that is displayed by the destination terminal 3, with reference to the table T1 shown in FIG. 2. The frame sampling unit 74 then samples the frame data sets Fr3 corresponding to the number. At this time, the frame data sets Fr3 are sampled at intervals that are obtained by dividing playtime of the moving image data set M0 by the number of frames. New frame data sets may also be generated and used as the frame data sets Fr3 by interpolation between the frames, in addition to the sampling.

The processing unit 75 carries out the color reduction processing on the frame data sets Fr3 sampled by the frame sampling unit 74, with reference to the palette data set P0. As a method of the color reduction processing, an error diffusion technique or the like can be used. In this manner, reduced-color frame data sets Fr4 are generated.

The compilation unit 76 generates one file by arranging the reduced-color frame data sets Fr4 generated by the processing unit 75 in chronological order. In this manner, a reduced-color moving image data set R0 wherein the frames are serially changed is generated.

The coding unit 77 carries out coding on the reduced-color moving image data set R0, and generates the reduced-color moving image data set R1. At this time, the coding is carried out to cause a data size of the reduced-color moving image data set R1 to become the data size K or smaller. As a file format for the reduced-color moving image data set R1, Animated GIF or MNG that is a format of PNG corresponding to Animated GIF may be used, which is not necessarily limited thereto.

The image output unit 56 in FIG. 3 outputs the multimedia image data set F1 generated by the multimedia image generation unit 54 or the reduced-color moving image data set R1 generated by the reduced-color moving image generation unit 55 to the image storage unit 14 or to the image attaching unit 16.

The image attaching unit 16 in FIG. 1 generates an email E2 by attaching the moving image data set M0, or the multimedia image data set F1, or the reduced-color moving image data set R1 to the main content E1, in the case where the destination terminal 3 can receive the image-attached email as it is.

The URL attaching unit 17 generates an email E3 by attaching the URL representing where the moving image data set M0, or the multimedia image data set F1, or the reduced-color moving image data set R1 is stored in the image storage unit 14 to the main content E1 in the case where the destination terminal 3 cannot receive the image-attached email as it is.

The email transmission unit 18 sends the email E2 or E3 to the destination terminal 3 via a mobile phone communication network.

The request reception unit 19 receives an image downloading request sent from the destination terminal 3 after the destination terminal 3 receives the email E3 attached with the URL. The request sent from the destination terminal 3 includes the URL of the moving image data set M0, or the multimedia image data set F1, or the reduced-color moving image data set R1.

The image reading unit 20 reads the moving image data set M0, or the multimedia image data set F1, or the reduced-color moving image data set R1 from the image storage unit 14, by referring to the URL included in the request received by the request reception unit 19.

The image transmission unit 21 sends the moving image data set M0, or the multimedia image data set F1, or the reduced-color moving image data set R1 read by the image reading unit 20 to the destination terminal 3 that sent the request, via the mobile phone communication network.

Figure 6:
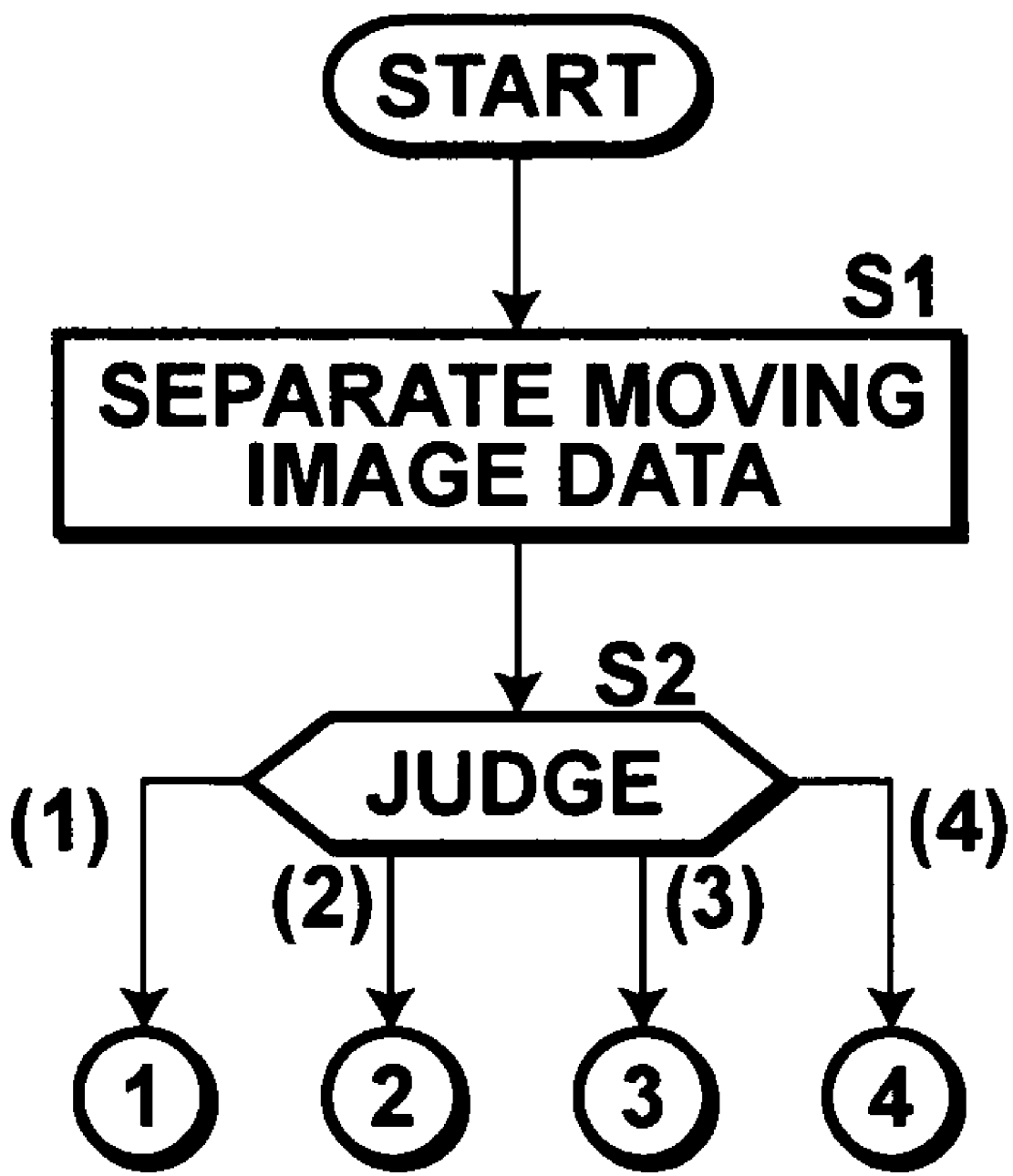
FIG. 6 is a flow chart showing a procedure carried out in the first embodiment (part 1)

A procedure carried out in the first embodiment will be explained next. FIG. 6 is a flow chart showing the procedure. When the email reception unit 11 receives the email E0 attached with the moving image data set M0 from the sender terminal 3, the procedure starts. The moving image separation unit 12 separates the moving image data set M0 from the email E0 (Step S1). The model judgment unit 13 judges which of the cases (1) to (4) is the case for the destination terminal 3, by referring to the database 13A based on the destination email address included in the header of the main content E1 (Step S2).

Figure 7:
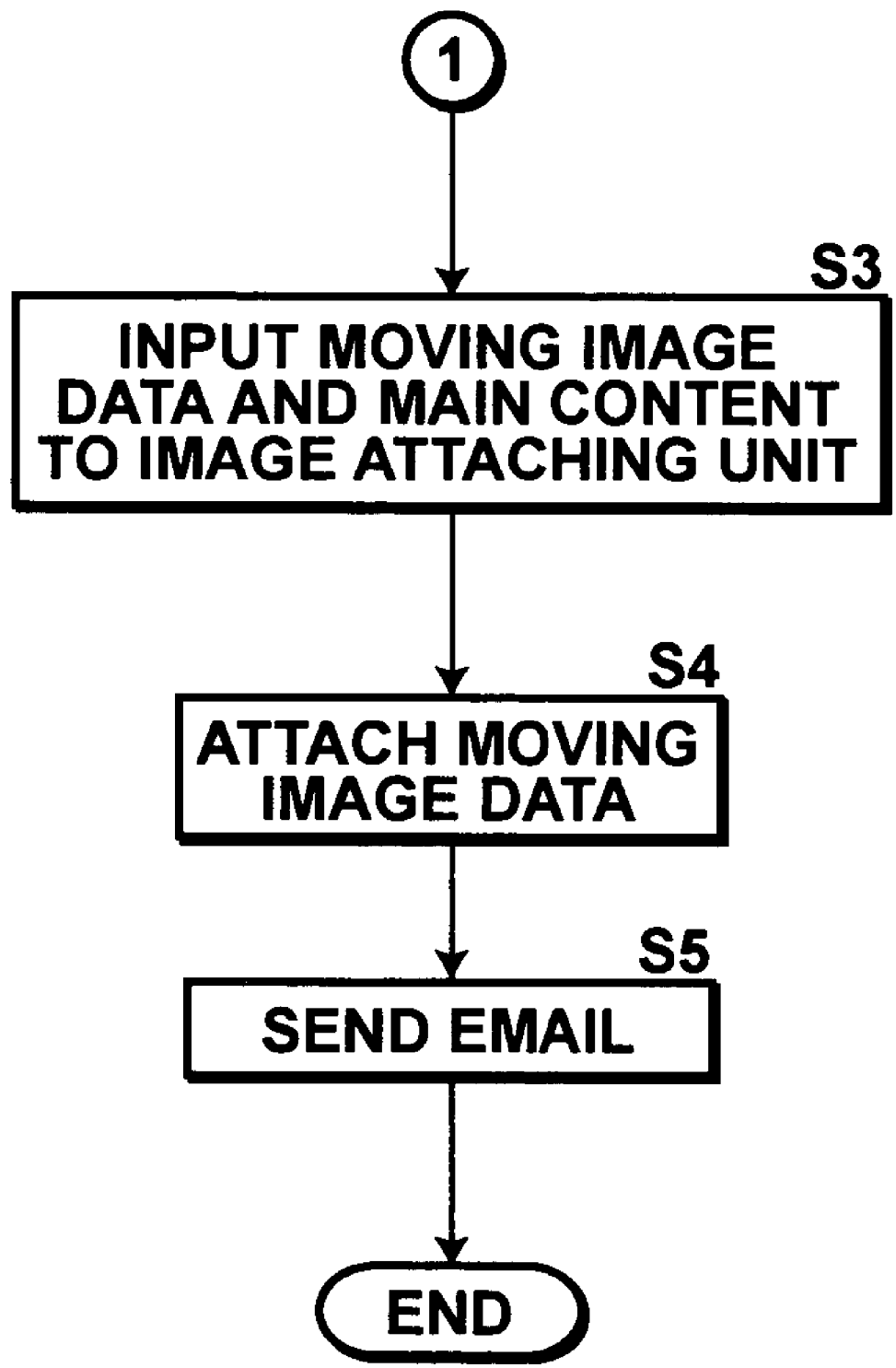
FIG. 7 is a flow chart showing the procedure carried out in the first embodiment (part 2)

If the result is the case (1), the procedure goes to a flow chart shown in FIG. 7. The model judgment unit 13 and the moving image separation unit 12 respectively input the moving image data set M0 and the main content E1 to the image attaching unit 16 (Step S3). The image attaching unit 16 generates the image-attached email E2 by attaching the moving image data set M0 to the main content E1 (Step S4), and the email transmission unit 18 sends the email E2 to the destination terminal 3 (Step S5) to end the procedure.

The terminal 3 receiving the email E2 can carry out moving image display. Therefore, the moving image data set M0 attached to the email E2 can be displayed on the destination terminal 3.

Figure 8:
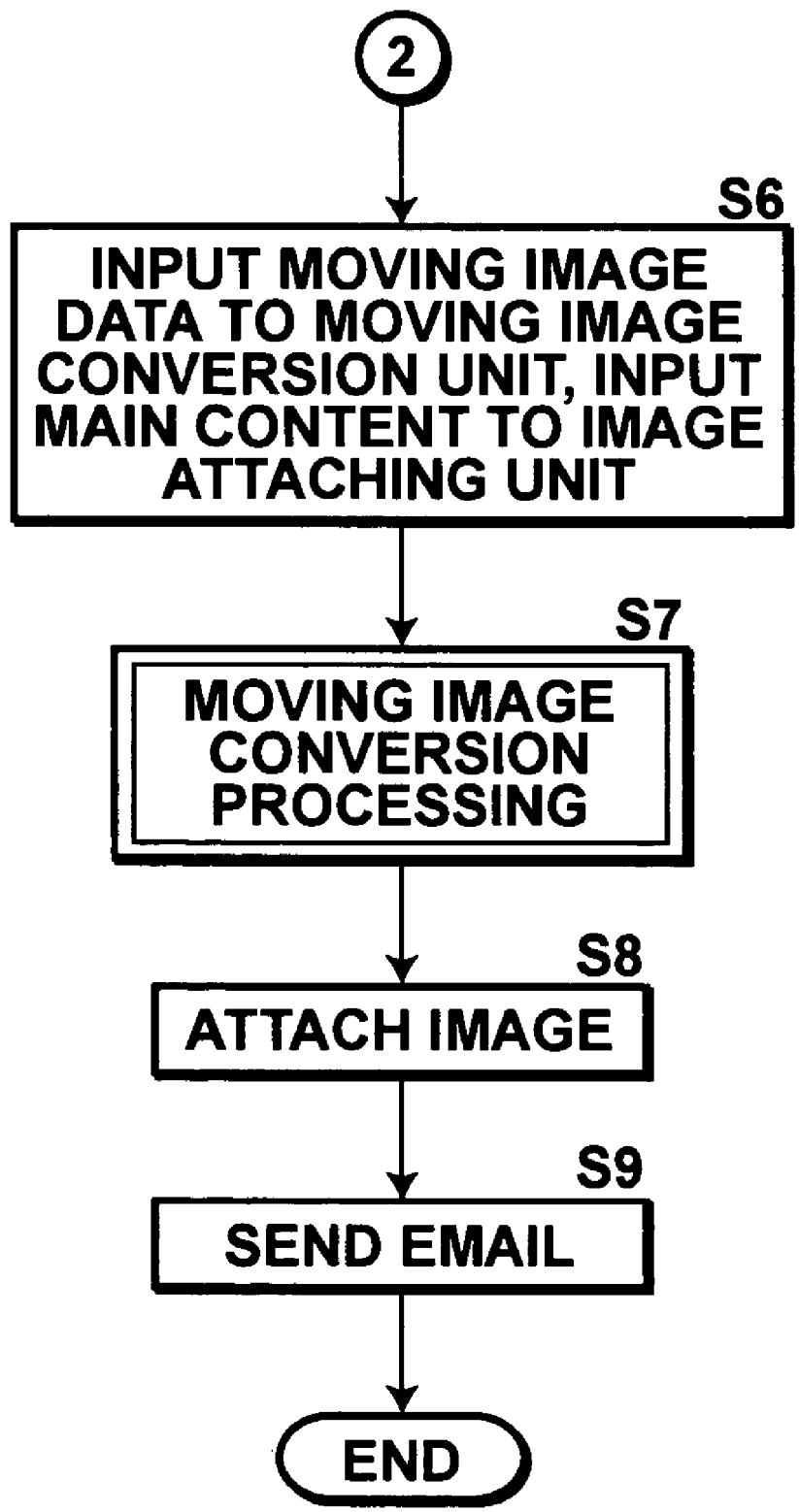
FIG. 8 is a flow chart showing the procedure carried out in the first embodiment (part 3)

If the result is (2), the procedure goes to a flow chart shown in FIG. 8. The model judgment unit 13 inputs the moving image data set M0 to the moving image conversion unit 15, and the moving image separation unit 12 inputs the main content E1 to the image attaching unit 16 (Step S6). The moving image conversion unit 15 carries out moving image conversion processing on the moving image data set M0 (Step S7).

Figure 9:
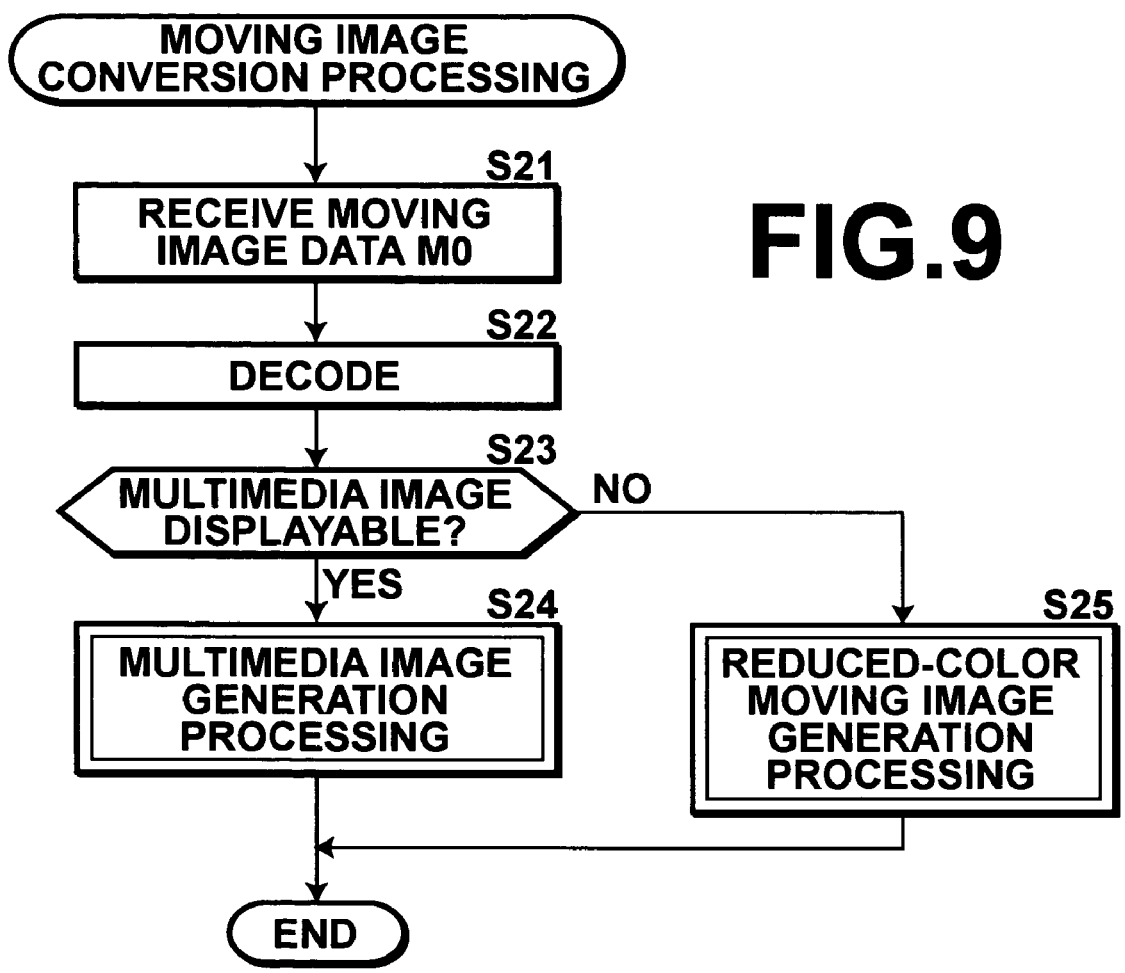
FIG. 9 is a flow chart showing a procedure of moving image conversion processing.

FIG. 9 is a flow chart showing the moving image conversion processing. The moving image input unit 51 receives an input of the moving image data set M0 (Step S21). The decoding unit 52 decodes the moving image data set M0, and obtains the raw moving image data set M0' (Step S22). The output format determination unit 53 then judges whether or not the terminal 3 can carry out multimedia image display, based on the table T1 (Step S23). If a result at Step S23 is affirmative, the multimedia image generation unit 54 carries out multimedia image generation processing on the raw moving image data set M0' (Step S24).

Figure 10:
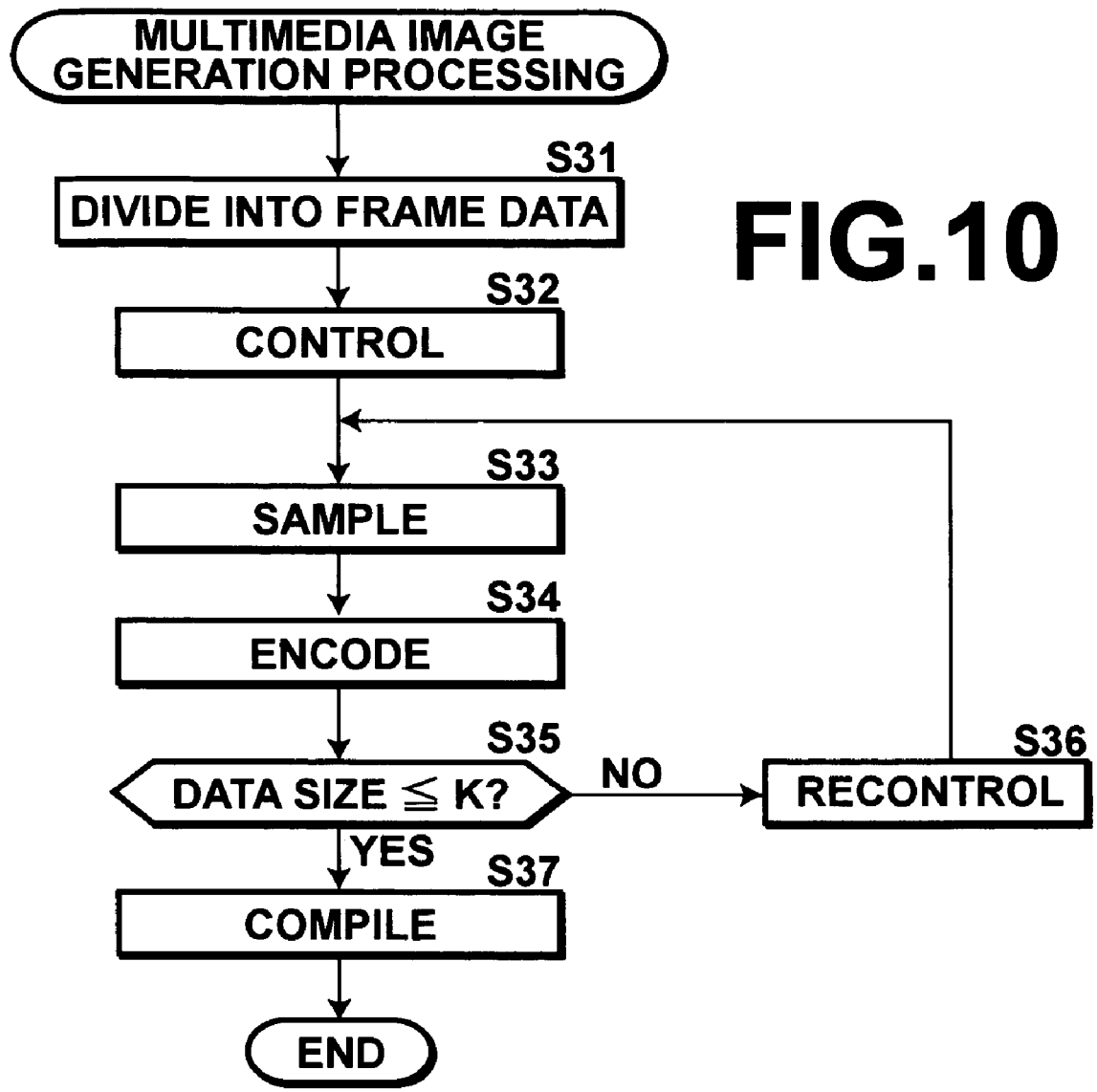
FIG. 10 is a flow chart showing a procedure of multimedia image generation processing.

FIG. 10 is a flow chart showing a procedure in the multimedia image generation processing. The frame division unit 61 divides the raw moving image data set M0' into the frame data sets Fr0 that are the image data sets for respective frames (Step S31), and the coding control unit 62 controls the frame sampling unit 63 and the frame coding unit 64 for causing the data size of the multimedia image data set F1 to become the data size K or smaller (Step S32).

The frame sampling unit 63 samples the frame data sets Fr1 comprising the multimedia image data set F1 from the frame data sets Fr0 (Step S33). The frame coding unit 64 then generates the compressed frame data sets Fr2 by carrying out the coding on the sampled frame data sets Fr1 (Step S34). The frame coding unit 64 also judges whether the data size of the multimedia image data set F1 to be generated from the compressed frame data sets Fr2 by the compilation unit 65 is equal to or smaller than the data size K (Step S35). If a result at Step S35 is negative, the frame coding unit 64 inputs the information to the coding control unit 62. The coding control unit 62 controls the frame sampling unit 63 and the frame coding unit 64 to cause the data size of the multimedia image data set F1 to become equal to or smaller than the data size K (Step S36), and the procedure returns to Step S33. The frame sampling unit 63 and the frame coding unit 64 repeat the procedure from Step S33 until the data size of the multimedia image data set F1 becomes equal to or smaller then the data size K.

If the result at Step S35 is affirmative, the compilation unit 65 compiles the compressed frame data sets Fr2 into the Flash™ movie, and generates the multimedia image data set F1 (Step S37) to end the multimedia image generation processing.

If the result at Step S23 in FIG. 9 is negative, the reduced-color moving image generation unit 55 carries out reduced-color moving image generation processing on the raw moving image data set M0' (Step S25).

Figure 11:
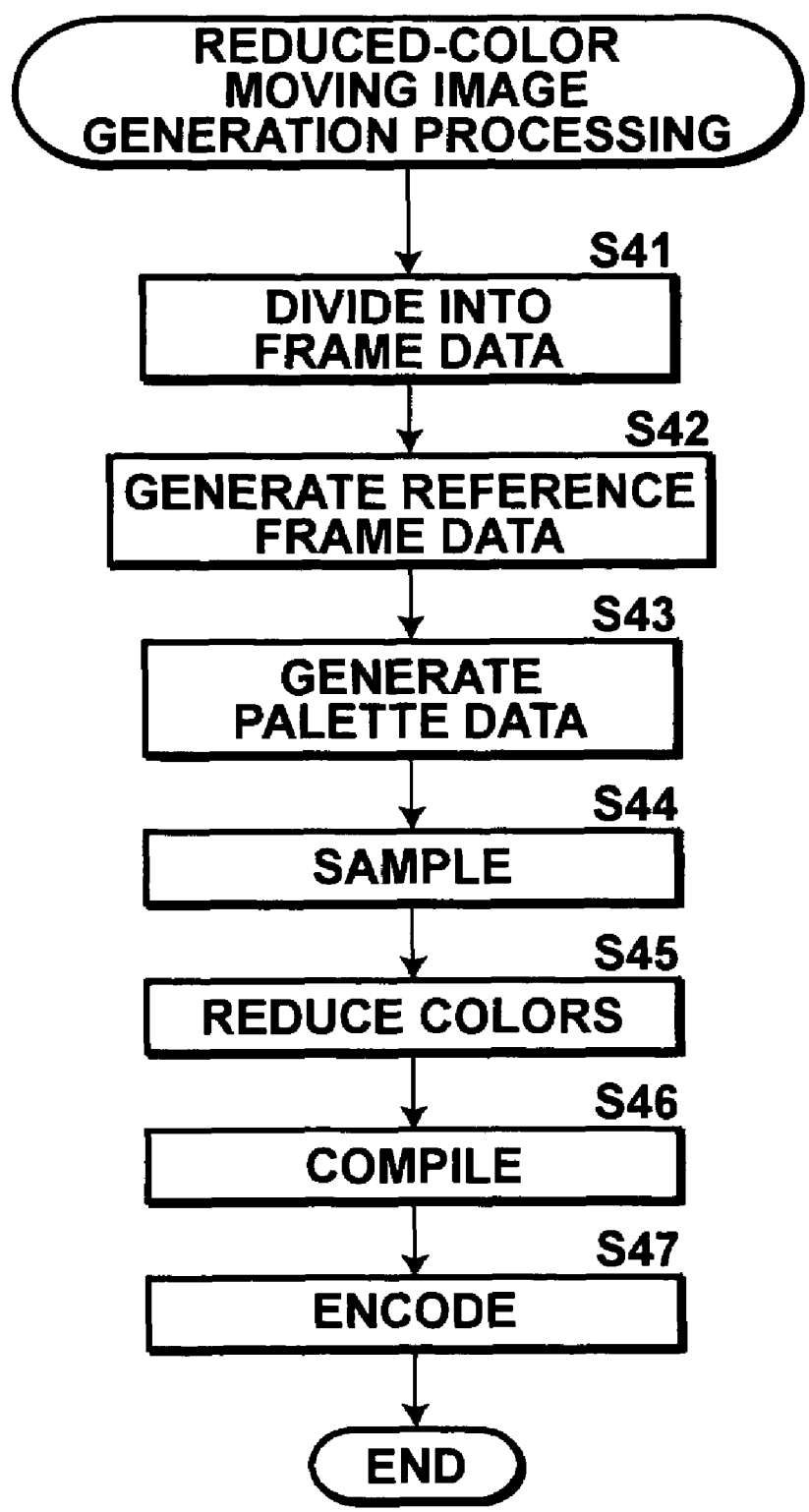
FIG. 11 is a flow chart showing a procedure of reduced-color moving image generation processing.

FIG. 11 is a flow chart showing a procedure in the reduced-color moving image generation processing. The frame division unit 71 divides the raw moving image data set M0' into the frame data sets Fr0 (Step S41), and the reference frame generation unit 72 generates the reference frame data set B0 from the frame data sets Fr0 (Step S42). The palette data generation unit 73 then generates the palette data set P0 from the reference frame data set B0 (Step S43).

The frame sampling unit 74 samples the frame data sets Fr3 comprising the reduced-color moving image from the frame data sets Fr0 (Step S44). The procedure at Step S44 may be carried out before the procedure at Steps S42 and S43. Alternatively, the procedure from Step S42 to Step S44 may be carried out in parallel.

The processing unit 75 generates the reduced-color frame data sets Fr4 by carrying out the color reduction processing on the sampled frame data sets Fr3 by using the palette data set P0 (Step S45). The compilation unit 76 then generates the reduced-color moving image data set R0 by arranging the reduced-color frame data sets Fr4 generated by the processing unit 75 in chronological order (Step S46). The coding unit 77 carries out the coding on the reduced-color moving image data set R0, and generates the reduced-color moving image data set R1 (Step S47) to end the reduced-color moving image generation processing.

The image attaching unit 16 generates the image-attached email E2 by attaching the multimedia image data set F1 or the reduced-color moving image data set R1 to the main content E1 (Step S8 in FIG. 8). The email transmission unit 18 then sends the email E2 to the destination terminal 3 (Step S9) to end the procedure.

Since the destination terminal 3 receiving the email E2 cannot carry out moving image display, an image having motion caused by continuously changing the frames sampled from the moving image data set M0 can be displayed on the terminal 3, based on the multimedia image data set F1 or the reduced-color moving image data set R1 attached to the email E2.

The multimedia image data set F1 can reproduce the image in higher quality than the reduced-color moving image data set R1. Therefore, the image having motion caused by continuously changing the frames sampled from the moving image data set M0 can be displayed in high quality on the terminal 3 that received the multimedia image data set F1.

Figure 12:
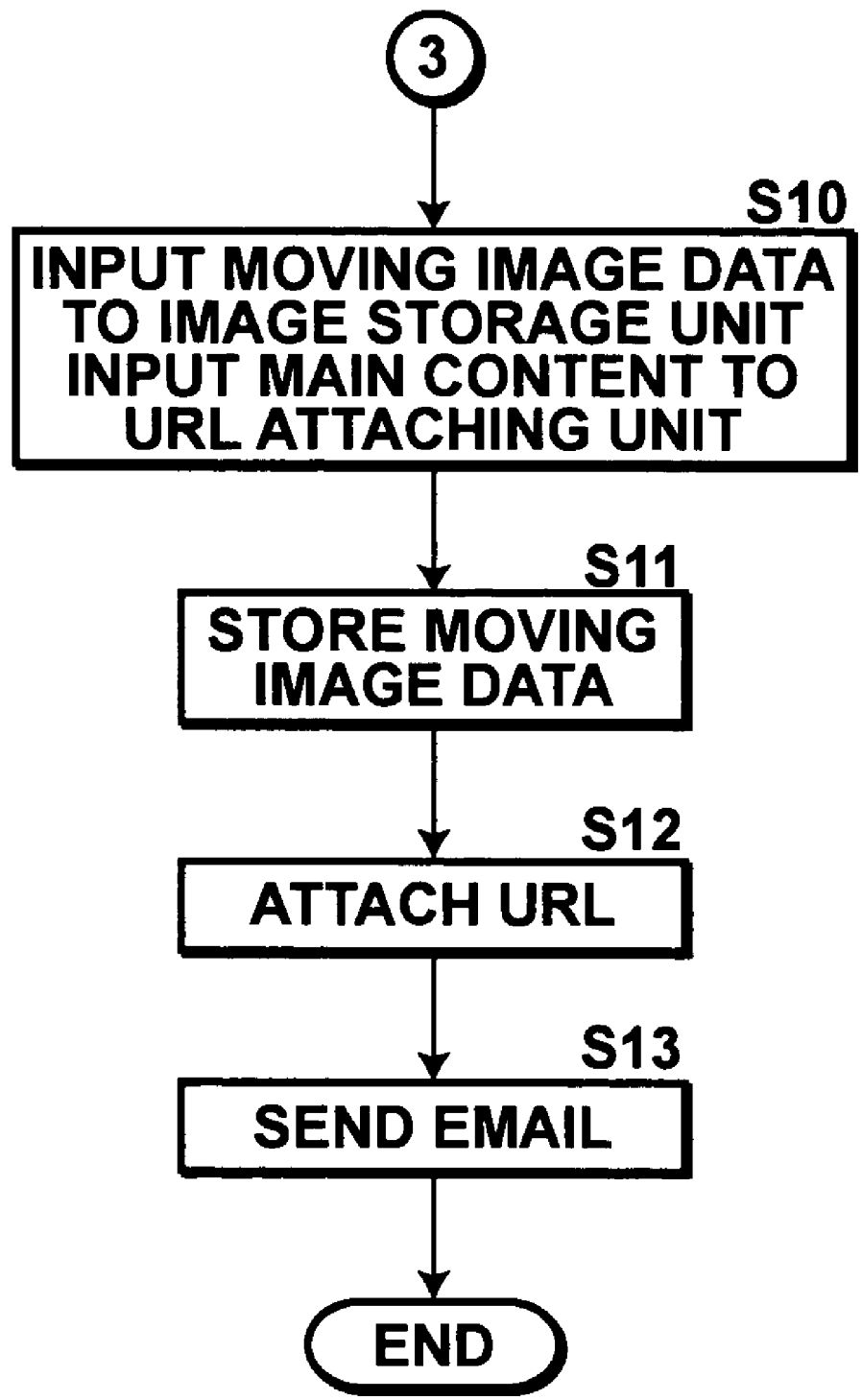
FIG. 12 is a flow chart showing the procedure carried out in the first embodiment (part 4)

In the case of (3) described above, the procedure goes to a flow chart shown in FIG. 12. The model judgment unit 13 inputs the moving image data set M0 to the image storage unit 14, and the moving image separation unit 12 inputs the main content E1 to the URL attaching unit 17 (Step S10). The image storage unit 14 stores the moving image data set M0 (Step S11). The URL attaching unit 17 generates the URL-attached email E3 by attaching the URL of the moving image data set M0 to the main content E1 (Step S12), and the email transmission unit 18 sends the email E3 to the destination terminal 3 (Step S13) to end the procedure.

Figure 13:
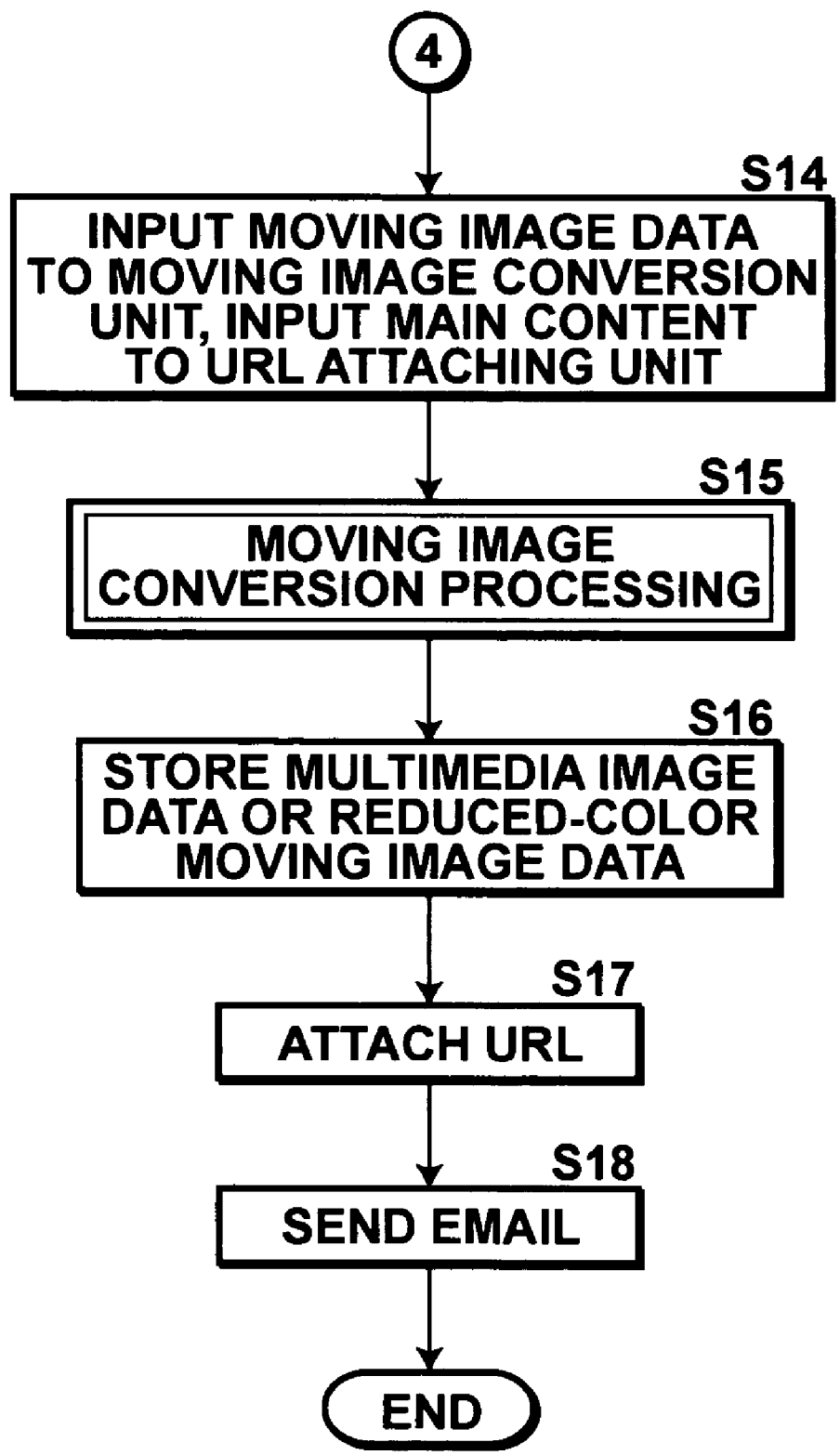
FIG. 13 is a flow chart showing the procedure carried out in the first embodiment (part 5)

In the case of (4), the procedure goes to a flow chart shown in FIG. 13. The model judgment unit 13 inputs the moving image data set M0 to the moving image conversion unit 15, and the moving image separation unit 12 inputs the main content E1 to the URL attaching unit 17 (Step S14). The moving image conversion unit 15 carries out the moving image conversion processing on the moving image data set M0 (Step S15). The image storage unit 14 stores the multimedia image data set F1 or the reduced-color moving image data set R1 generated through the moving image conversion processing (Step S16). The URL attaching unit 17 generates the URL-attached email E3 by attaching the URL of the multimedia image data set F1 or the reduced-color moving image data set R1 to the main content E1 (Step S17). The email transmission unit 18 then sends the email E3 to the destination terminal 3 (Step S18) to end the procedure.

In the cases (3) and (4), the destination terminal 3 that received the email E3 requests downloading of the moving image data set M0, or the multimedia image data set F1, or the reduced-color moving image data set R1 from the email relay server 1.

Figure 14:
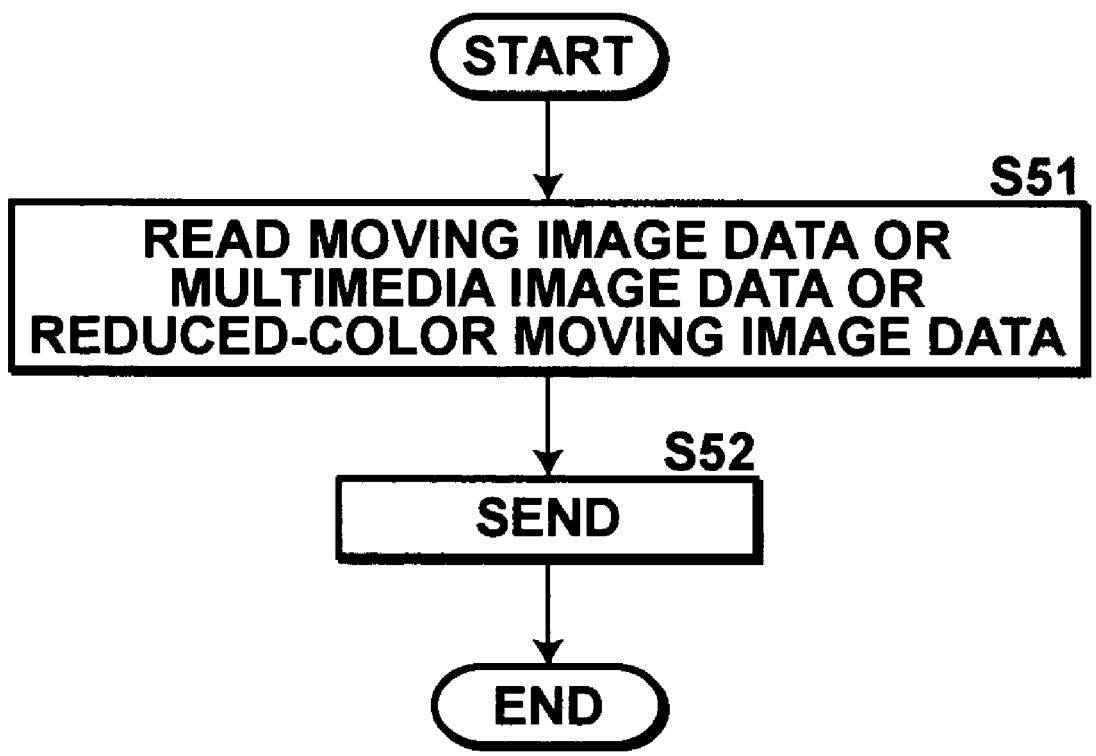
FIG. 14 is a flow chart showing a procedure carried out in the email relay server when a request is sent thereto.

FIG. 14 is a flow chart showing a procedure carried out in the email relay server 1 upon reception of the request. When the request reception unit 19 receives the request, the procedure starts. The image reading unit 20 reads the moving image data set M0, or the multimedia image data set F1, or the reduced-color moving image data set R1 from the image storage unit 14, with reference to the URL included in the request (Step S51). The image transmission unit 21 then sends the moving image data set M0, or the multimedia image data set F1, or the reduced-color moving image data set R1 to the destination terminal 3 (Step S52) to end the procedure.

The destination terminal 3 receives the moving image data set M0, or the multimedia image data set F1, or the reduced-color moving image data set R1. If the terminal 3 can carry out moving image display, the moving image data set M0 is sent thereto and displayed thereon. If the terminal 3 cannot carry out moving image display but can carry out multimedia image display, the multimedia image data set F1 is sent thereto. In this manner, the image having motion caused by serially changing the frames sampled from the moving image data set M0 can be displayed on the terminal 3 in high quality.

If the terminal 3 can carry out neither moving image display nor multimedia image display, the reduced-color moving image data set R1 is sent thereto. In this manner, the image having motion caused by serially changing the frames sampled from the moving image data set M0 can be displayed on the terminal 3, based on the reduced-color moving image data set R1.

As has been described above, in the first embodiment, the model of the terminal 3 as the destination of the email E0 attached with the moving image is judged first, and the moving image data set M0 attached to the email E0 is converted into the multimedia image data set F1 or the reduced-color moving image data set R1 in the case where the model is not capable of moving image display. Therefore, even if the terminal 3 cannot display the moving image, pseudo moving image display can be carried out based on the multimedia image data set F1 or the reduced-color moving image data set R1.

Unlike the reduced-color moving image data set R1, the multimedia image data set F1 includes the frame data sets Fr2 compressed according to the compression method such as JPEG considering two-dimensional redundancy. Therefore, the image displayed frame by frame can be generated in high quality while the data size thereof is reduced compared to the case of the reduced-color moving image data set R1. Consequently, if the terminal 3 is not capable of moving image display and has a limit in the data size that can be dealt with, the multimedia image data set F1 allows pseudo moving image display in high quality. In this manner, the image displayed frame by frame can be reproduced in high quality on the terminal 3 if the destination terminal 3 has a high-resolution display screen.

Furthermore, since the multimedia image data set F1 is generated from the moving image data set M0 according to a characteristic of the destination terminal 3, the multimedia image data set F1 can be displayed on the destination terminal 3 with certainty.

In the case where the data size of the multimedia image data set F1 is larger than the data size K, the sampling of the frame data sets Fr1 and the coding of the frame data sets Fr2 are carried out repeatedly until the data size becomes equal to or smaller than the data size K. Therefore, the multimedia image data set F1 has the data size corresponding to the data size K that can be dealt with by the destination terminal 3.

In the case where the destination terminal 3 cannot display not only the moving image but also the multimedia image, the moving image data set M0 is converted into the reduced-color moving image data set R1 and sent to the terminal 3. Therefore, although the destination terminal 3 can carry out neither multimedia image display nor moving image display, pseudo moving image display can be realized by using the reduced-color moving image data set R1 although an image quality thereof is lower.

When the reduced-color moving image data set R1 is generated from the moving image data set M0, only the palette data set P0 is generated. Therefore, unlike the method described in Japanese Unexamined Patent Publication No. 11(1999)-259640, generation of palette data sets for every several frames becomes unnecessary. As a result, the reduced-color moving image data set R1 can be obtained from the moving image data set M0 without increasing a size of the apparatus.

Although the multimedia image data set F1 is generated as the Flash™ movie in the first embodiment, any format that enables interactive serial frame-by-frame display can be used.

In the first embodiment, sound included in the moving image data set M0 can be included in the multimedia image data set F1.

In the first embodiment described above, only the palette data set P0 is generated and used for generating the reduced-color moving image data set R1 from the moving image data set M0. However, as has been described in Japanese Unexamined Patent Publication No. 11(1999)-259640, palette data sets may be generated for every several frames and used in generation of the reduced-color moving image data set R1 from the moving image data set M0. In addition, any method may be used as long as the reduced-color moving image data set R1 can be generated from the moving image data set M0.

In the first embodiment, the moving image separation unit 12 may temporarily store the email E0 attached with the moving image data set M0 so that the email E0 attached with the moving image data set M0 is sent to the destination terminal 3 as it is from the email transmission unit 18 in the case where the result of the judgment made by the model judgment unit 13 is the case (1).

The format of the moving image data set M0 may be converted with reference to the table T1 for agreement with the display size and the number of displayable colors corresponding to the destination terminal 3. In this case, the multimedia image data set F1 and the reduced-color moving image data set R1 are generated from the format-converted moving image data set.

Figure 15:
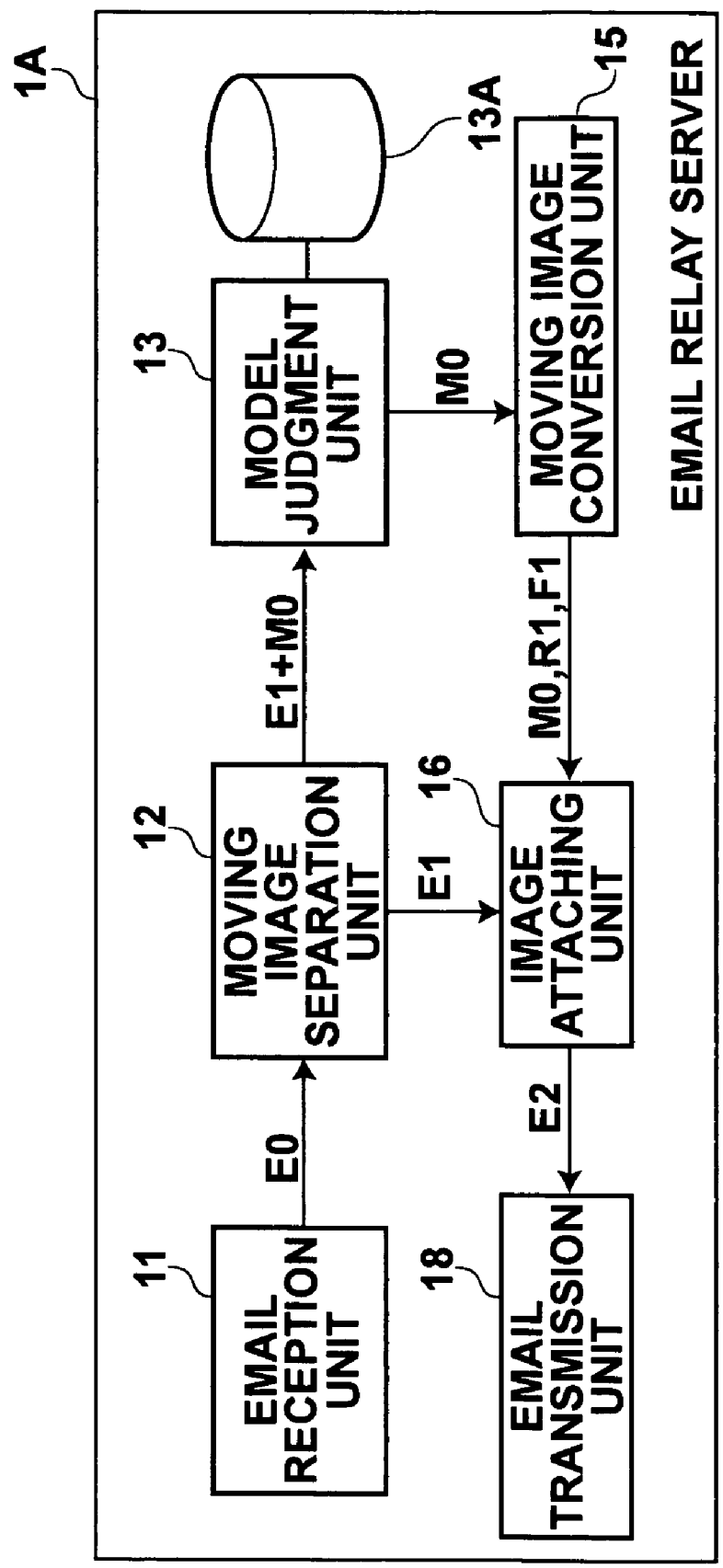
FIG. 15 is a block diagram showing a configuration of a modification to the email system using the email relay server adopting the email relay apparatus of the first embodiment of the present invention.

Although the email relay server 1 in the first embodiment relays the email regardless of whether or not the destination terminal 3 can receive the image-attached email without separation of the image attached thereto. However, the email relay server 1 can be configured specifically for use in the case where the destination terminal 3 can receive the image-attached email without separation of the image attached thereto. FIG. 15 shows an email relay server (referred to as an email relay server 1A) having the configuration. As shown in FIG. 15, the email relay server 1A does not have the image storage unit 14, the URL attaching unit 17, the request reception unit 19, the image reading unit 20, and the image transmission unit 21 of the email relay server 1 shown in FIG. 1.

Figure 16:
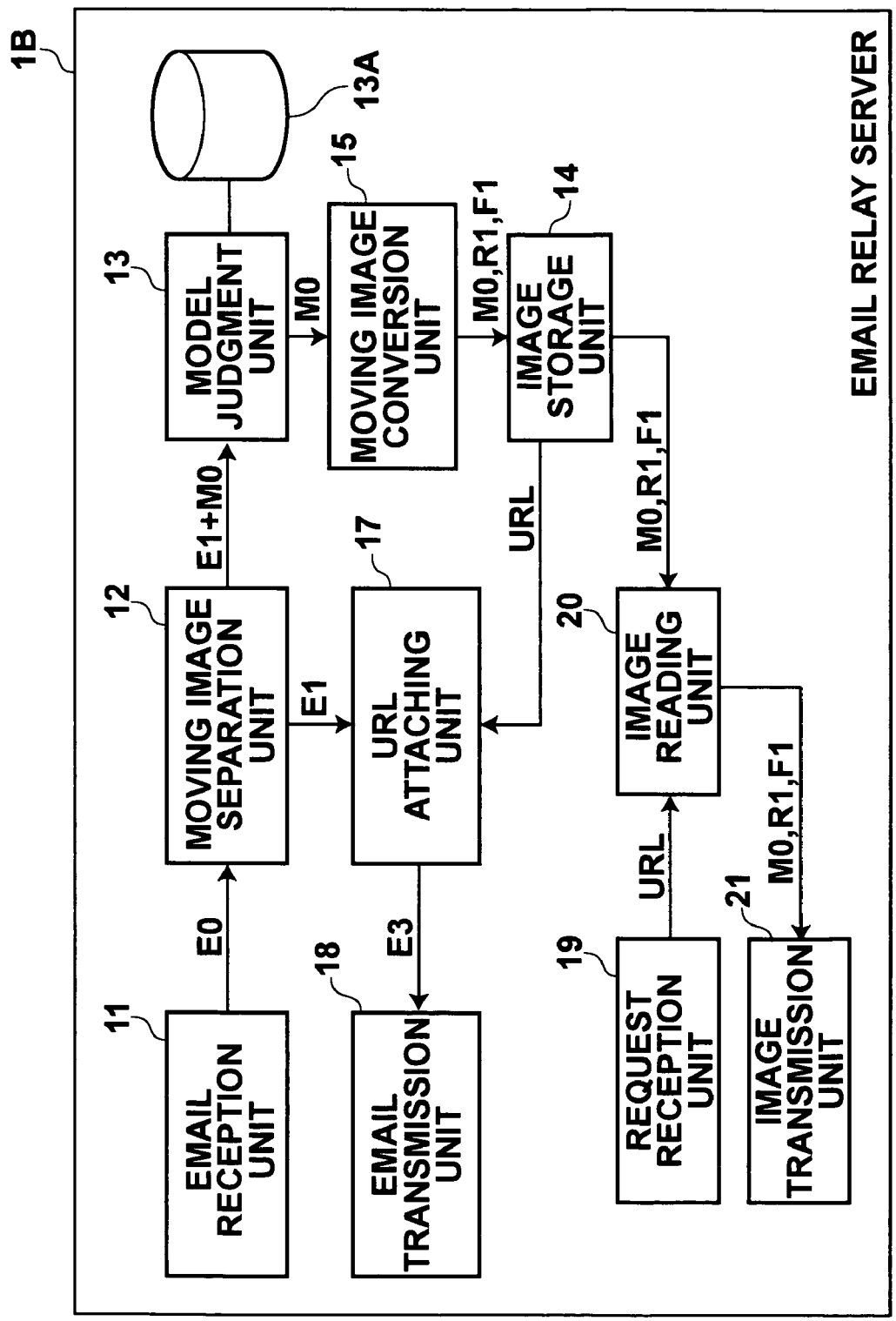
FIG. 16 is a block diagram showing a configuration of another modification to the email system using the email relay server adopting the email relay apparatus of the first embodiment of the present invention.

Furthermore, the email relay server 1 may be configured so as to be used specifically in the case where the destination terminal 3 cannot receive the image-attached email as it is. FIG. 16 shows an email relay server (referred to as an email relay server 1B) having the configuration. As shown in FIG. 16, the email relay server 1B does not have the image attaching unit 16 of the email relay server 1 shown in FIG. 1.

A second embodiment of the present invention will be explained next. FIG. 10 is a block diagram showing a configuration of an email system using an email relay server adopting an email relay apparatus of the second embodiment of the present invention. In the second embodiment, the same elements as in the first embodiment have the same reference numbers, and detailed explanations thereof will be omitted.

Figure 17:
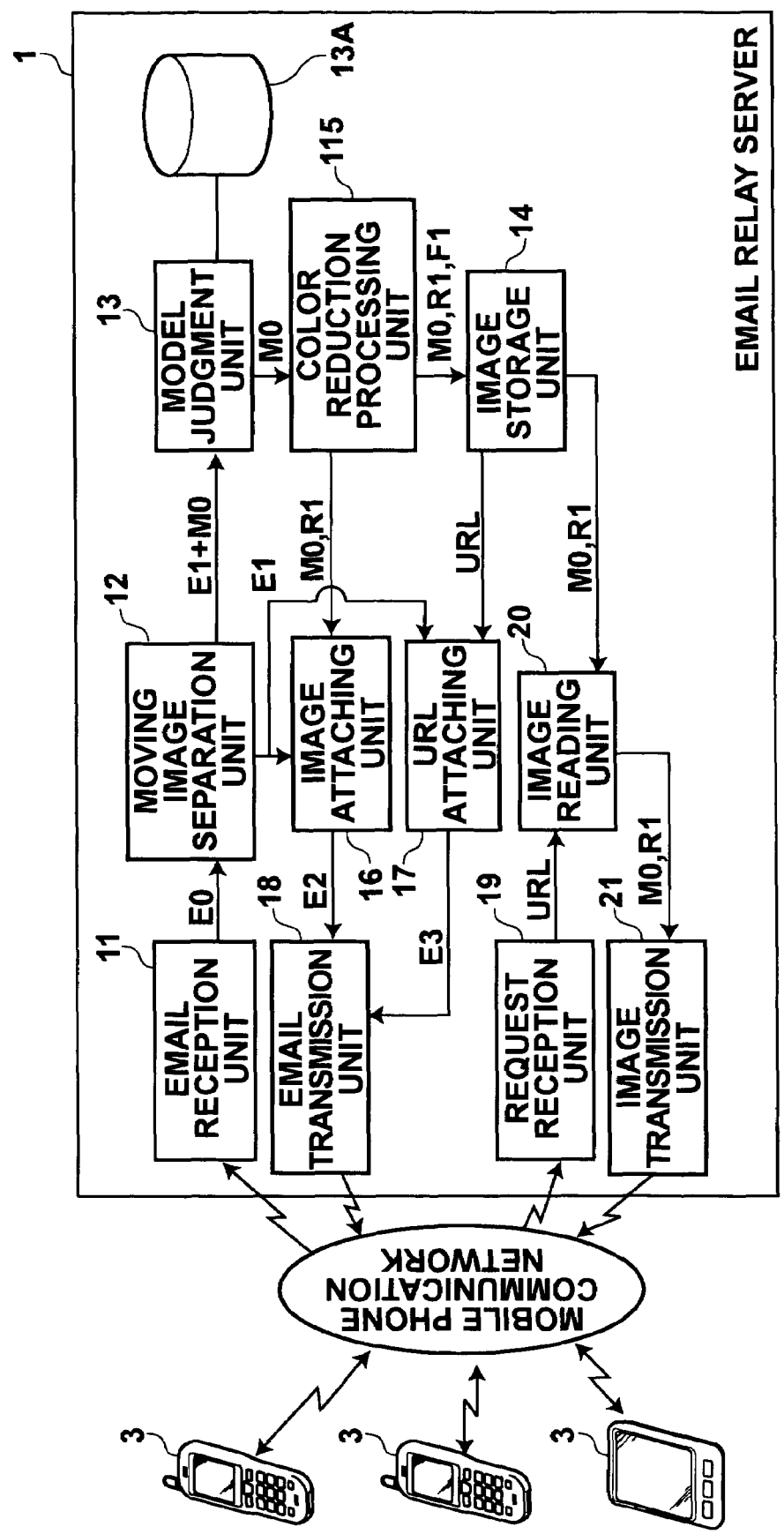
FIG. 17 is a block diagram showing a configuration of an email system using an email relay server adopting an email relay apparatus of a second embodiment of the present invention.

As shown in FIG. 17, the email system in the second embodiment comprises a color reduction processing unit 115 instead of the moving image conversion unit 15 in the email relay server 1 in the first embodiment.

Figure 18:
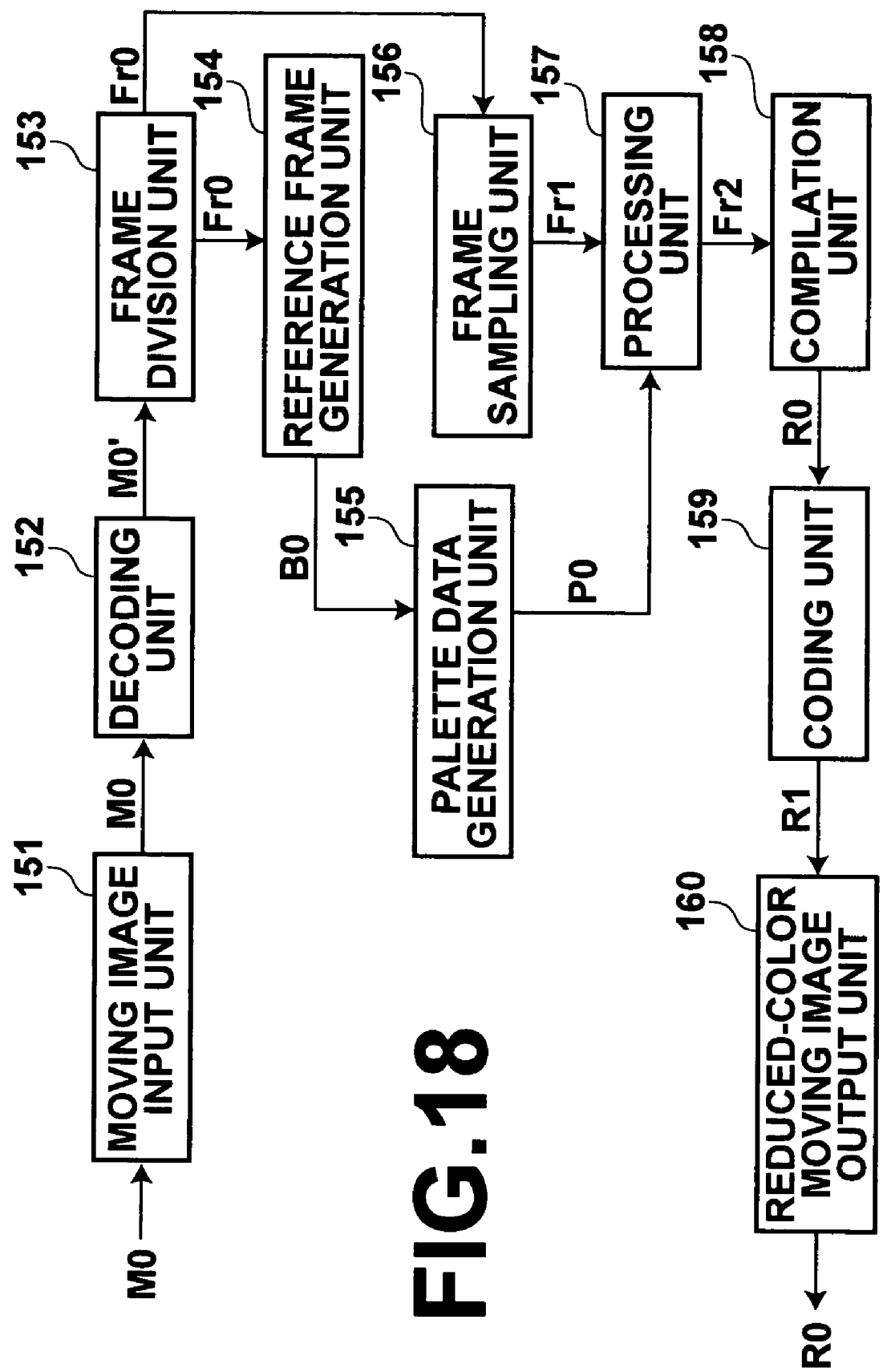
FIG. 18 is a block diagram showing a configuration of a color reduction processing unit.

The color reduction processing unit 115 converts a format-converted moving image data set M1 into a reduced color moving image data set R1 in the case where a destination terminal 3 cannot carry out moving image display. FIG. 18 is a block diagram showing a configuration of the color reduction processing unit 115. As shown in FIG. 18, the color reduction processing unit 115 comprises a moving image input unit 151, a decoding unit 152, a frame division unit 153, a reference frame generation unit 154, a palette data generation unit 155, a frame sampling unit 156, a processing unit 157, a compilation unit 158, a coding unit 159, and a reduced-color moving image output unit 160.

The moving image input unit 151, the decoding unit 152, the frame division unit 153, the reference frame generation unit 154, the palette data generation unit 155, the frame sampling unit 156, the processing unit 157, the compilation unit 158, the coding unit 159, and the reduced-color moving image output unit 160 in the second embodiment respectively operate in the same manner as the moving image input unit 51, the decoding unit 52, the frame division unit 71, the reference frame generation unit 72, the palette data generation unit 73, the frame sampling unit 74, the processing unit 75, the compilation unit 76, the coding unit 77, and the image output unit 56 in the first embodiment, and detailed explanations thereof will be omitted.

Figure 19:
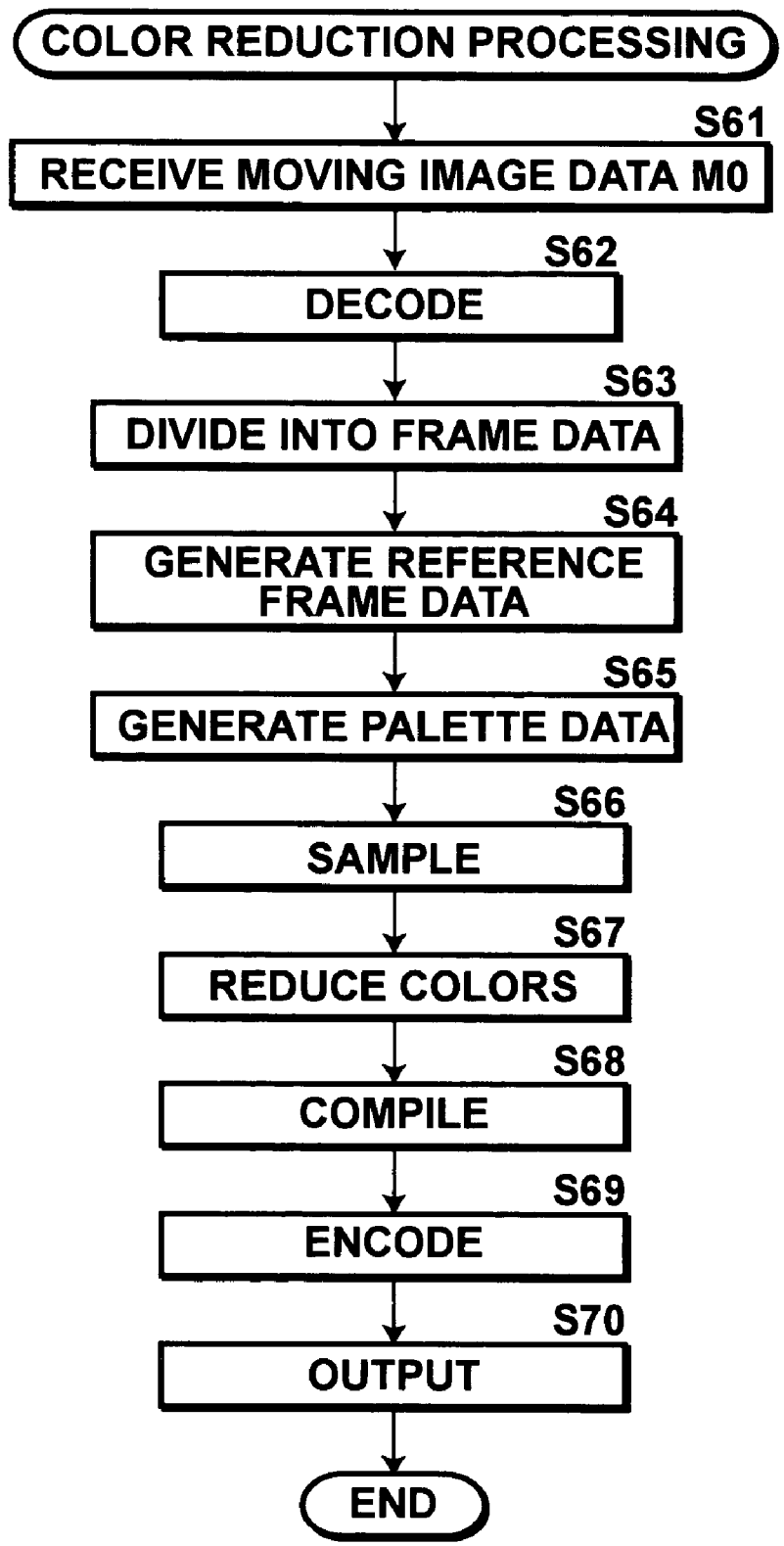
FIG. 19 is a flow chart showing a procedure of color reduction processing.

A procedure carried out in the second embodiment will be explained next. Since color reduction processing is carried out in the second embodiment instead of the moving image conversion processing at Steps S7 and S15 in the first embodiment, only the color reduction processing will be explained below. FIG. 19 is a flow chart showing a procedure in the color reduction processing. The moving image input unit 151 receives a moving image data set M0 (Step S61), and the decoding unit 152 decodes the moving image data set M0 to generate a raw moving image data set M0' (Step S62). The frame division unit 153 divides the raw moving image data set M0' into frame data sets Fr0 (Step S63), and the reference frame generation unit 154 generates a reference frame data set B0 from the frame data sets Fr0 (Step S64). The palette data generation unit 155 then generates a palette data set P0 from the reference frame data set B0 (Step S65).

The frame sampling unit 156 samples frame data sets Fr3 used for generating the reduced-color moving image data set R1 from the frame data sets Fr0 (Step S66). The procedure at Step S66 may be carried out before the procedure at Steps S64 and S65. Alternatively, the procedure from Steps S64 to Step S66 may be carried out in parallel.

The processing unit 157 generates reduced-color frame data sets Fr4 by reducing colors in the frame data sets Fr3 with reference to the palette data set P0 (Step S67). The compilation unit 158 then arranges the reduced-color frame data sets Fr4 generated by the processing unit 157 in chronological order, and generates a raw reduced-color moving image data set R0 (Step S68). The coding unit 159 encodes the raw reduced-color moving image data R0, and generates the reduced-color moving image data set R1 (Step S69). The reduced-color moving image output unit 160 then outputs the reduced-color moving image data set R1 (Step S70) to end the color reduction processing.

In the second embodiment, the procedure at Steps S8 and S9 in the flow chart shown in FIG. 8 for the first embodiment is carried out if the result of judgment at Step S6 in the flow chart in FIG. 6 is the case (2). In other words, an email E2 is generated by attaching the reduced-color moving image data set R1 to main content E1, and the email E2 is sent to the destination terminal 3.

The destination terminal 3 receives the email E2. The terminal 3 cannot display a moving image, but can display an image having motion caused by serially changing frames sampled from the moving image data set M0, based on the reduced-color moving image data set R1 attached to the email E2.

In the case where the result of judgment is (4), the procedure from Step S16 to Step S18 in the flow chart in FIG. 13 for the first embodiment is carried out in the second embodiment. More specifically, a model judgment unit 13 inputs the moving image data set M0 to the color reduction processing unit 115, and a moving image separation unit 12 inputs the main content E1 to a URL attaching unit 17. The color reduction processing unit 115 carries out the color reduction processing on the moving image data set M0. An image storage unit 14 stores the reduced-color moving image data set R1. The URL attaching unit 17 generates a URL-attached email E3 by attaching URL of the reduced-color moving image data set R1 to the main content E1. An email transmission unit 18 then sends the email E3 to the destination terminal 3 to end the procedure.

In this case, the terminal 3 that received the email E3 requests downloading of the moving image data set M0 or the reduced-color moving image data set R1 from the email relay server 1. In this manner, the destination terminal 3 can receive the reduced-color moving image data set R1. The image having motion caused by serially changing the frames sampled from the moving image data set M0 can be displayed on the terminal 3, based on the reduced-color moving image data set R1.

As has been described above, in the second embodiment, the model of the terminal 3 as the destination of an email E0 attached with the moving image data set M0 is judged first. The moving image data set M0 attached to the email E0 is converted into the reduced-color moving image data set R1 and sent to the destination terminal 3 in the case where the model is not capable of moving image display. Therefore, even if the destination terminal 3 cannot carry out moving image display, pseudo moving image display can be realized based on the reduced-color moving image data set R1.

When the reduced-color moving image data set R1 is generated from the moving image data set M0, only the palette data set P0 is generated. Therefore, unlike the method described in Japanese Unexamined Patent Publication No. 11(1999)-259640, generation of palette data sets for every several frames becomes unnecessary. As a result, the reduced-color moving image data set R1 can be obtained from the moving image data set M0 without increasing a size of the apparatus.

In the second embodiment described above, only the palette data set P0 is generated and used for generating the reduced-color moving image data set R1 from the moving image data set M0. However, as has been described in Japanese Unexamined Patent Publication No. 11(1999)-259640, palette data sets may be generated for every several frames and used in generation of the reduced-color moving image data set R1 from the moving image data set M0. In addition, any method may be used as long as the reduced-color moving image data set R1 can be generated from the moving image data set M0.

In the second embodiment, the moving image separation unit 12 may temporarily store the email E0 attached with the moving image data set M0 so that the email E0 attached with the moving image data set M0 is sent to the destination terminal 3 as it is from the email transmission unit 18 in the case where the result of the judgment made by the model judgment unit 13 is the case (1).

In the case where the reduced-color moving image data set R1 is sent to the destination terminal 3, a file size of image data that can be displayed on the terminal 3 is limited. Therefore, without considering the file size limit, the reduced-color moving image data set R1 may not be displayed on the terminal 3.

For this reason, by generating the reduced-color moving image data set R1 in such a manner that the reduced-color moving image data set R3 has the file size corresponding to the model of the destination terminal 3, the reduced-color moving image data set R1 can be displayed on the destination terminal 3 without fail once the reduced-color moving image data set R1 is sent thereto.

Figure 20:
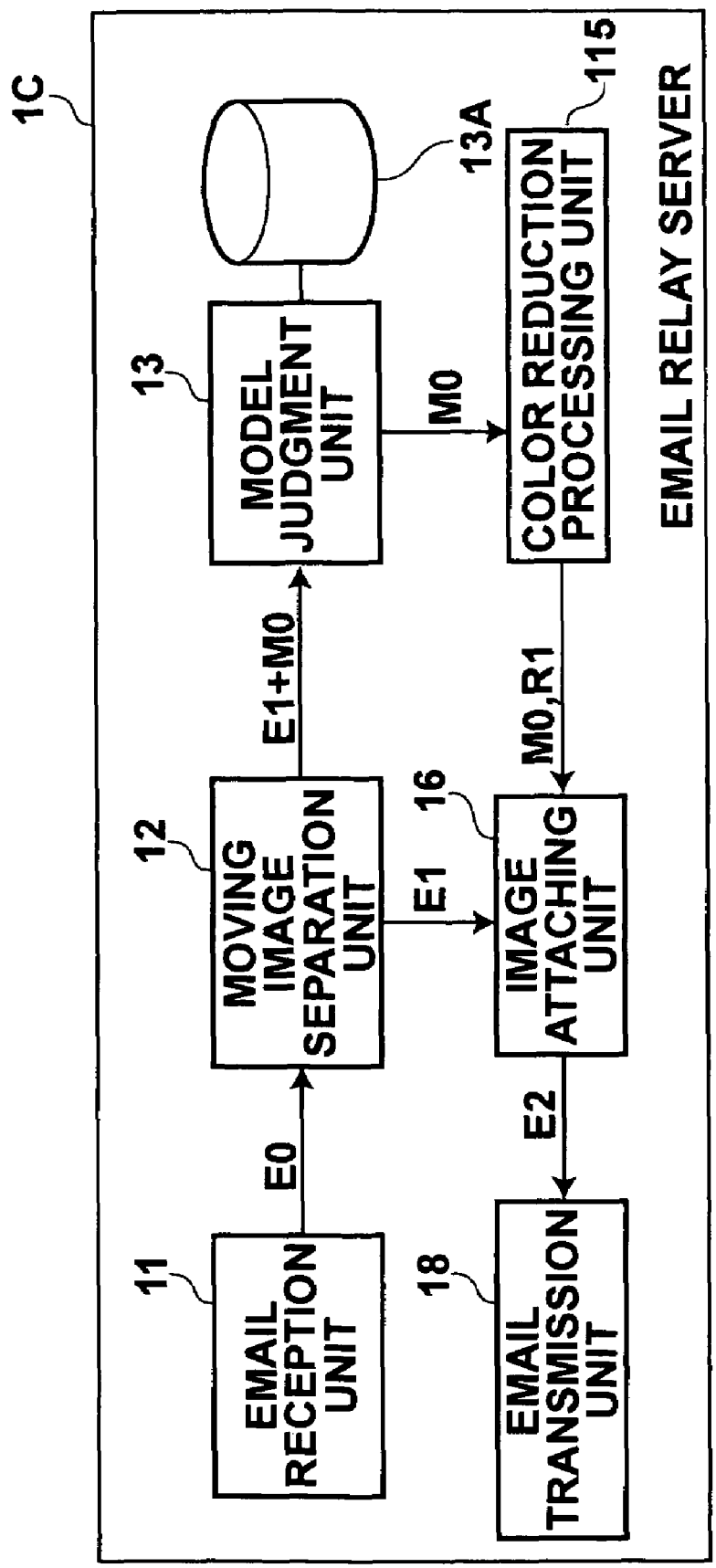
FIG. 20 is a block diagram showing a configuration of a modification to the email system using the email relay server adopting the email relay apparatus of the second embodiment of the present invention.

Although the email relay server 1 in the second embodiment relays the image-attached email regardless of whether or not the destination terminal 3 can receive the image-attached email as it is. However, the email relay server 1 can be configured specifically for use in the case where the destination terminal 3 can receive the image-attached email as it is. FIG. 20 shows an email relay server (referred to as an email relay server 1C) having the configuration. As shown in FIG. 20, the email relay server 1C does not have the image storage unit 14, the URL attaching unit 17, a request reception unit 19, an image reading unit 20, and an image transmission unit 21 of the email relay server 1 shown in FIG. 17.

Figure 21:
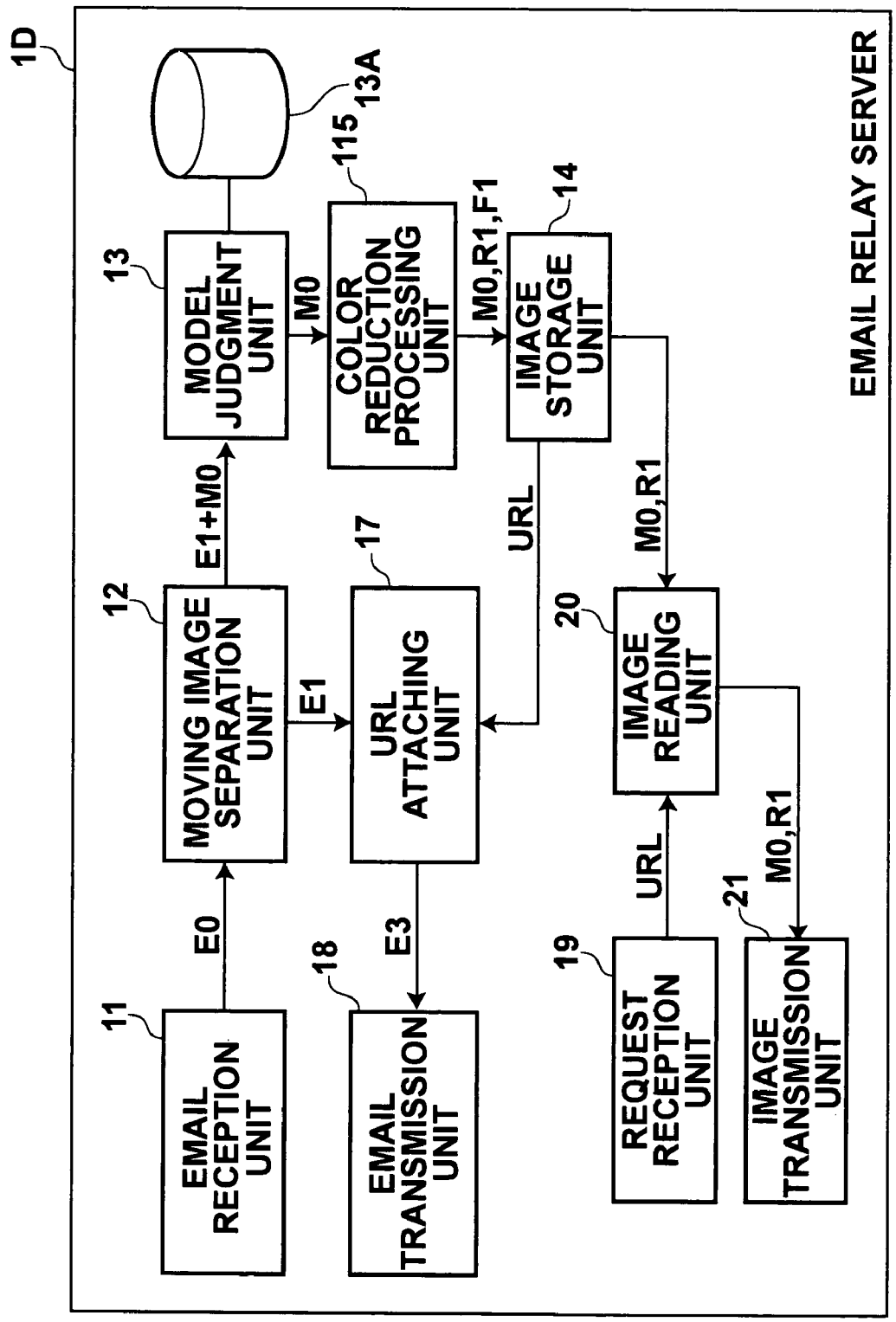
FIG. 21 is a block diagram showing a configuration of another modification to the email system using the email relay server adopting the email relay apparatus of the second embodiment of the present invention.

Furthermore, the email relay server 1 may be configured so as to be used specifically in the case where the destination terminal 3 cannot receive the image-attached email as it is. FIG. 21 shows an email relay server (referred to as an email relay server 1D) having the configuration. As shown in FIG. 21, the email relay server 1D does not have an image attaching unit 16 of the email relay server 1 shown in FIG. 17.

What is claimed is:

1. An email relay method for sending an email attached with a moving image to a terminal as a destination of the email, the email relay method comprising the steps of:
   judging a model of a recipient terminal based on a destination email address included in a header of the email to determine a recipient terminal type, with at least one associated media file format corresponding to the recipient terminal type;
   determining the recipient terminal is capable of displaying a moving image and sending the moving image to the recipient terminal when the recipient terminal type is capable of displaying a moving image based upon the recipient terminal type and the at least one associated media file format;
   determining the recipient terminal type is capable of displaying a multimedia image when the recipient terminal type is not capable of displaying a moving image;
   converting the moving image into a multimedia image when the recipient terminal type is not capable of moving image display and associates the conversion of the moving image with a media file format corresponding to the recipient terminal type for multimedia image display, whereby the email relay sends the multimedia image instead of the moving image to the recipient terminal;
   determining the recipient terminal type is capable of displaying a reduced-color image when the recipient terminal type is not capable of displaying a moving image and a multimedia image; and
   converting the moving image into a reduced-color moving image when the recipient terminal type is not capable of a moving image display and is not capable of a multimedia image display, but is capable of a reduced-color moving image display and associates the conversion of the moving image with a media file format corresponding to the recipient terminal type for a multimedia image display, whereby the email relay sends the reduced-color moving image to the recipient terminal,
   wherein converting the moving image into a multimedia image includes:
      sampling frames from the moving image;
      enlarging or reducing the frames according to the characteristic of the display device;
      compressing the frames by the compression method considering two-dimensional redundancy so that a data size of the multimedia image can be dealt with by the display device; and
      generating the multimedia image by compiling the frames compressed by the by the compression method, and
   wherein compressing the frames further comprises:
      repeating the changing of a compression ratio of the frames and/or thinning of the frames until the data size of the multimedia image becomes the data size that can be dealt with by the display device when the data size of the multimedia image is larger than the data size that can be dealt with by the display device.

2. The email relay method according to claim 1, wherein the recipient terminal is a mobile terminal.

3. An email relay method according to claim 1, wherein the reduced-color moving image conversion further comprises:
   reference frame generation means for generating a reference frame that represents frames comprising the moving image;
   palette data generation means for generating a palette data set including a predetermined number of colors from the reference frame;
   frame sampling means for sampling, from the frames, reduced-color moving image generation frames to be used for generating the reduced-color moving image;
   color reduction processing means for converting the reduced-color moving image generation frames into reduced-color moving image frames according to the palette data set; and
   frame compilation means for compiling the reduced-color moving image from the reduced-color moving image frames.

4. The email relay method according to claim 3, wherein the reference frame generates the reference frame from all or a part of the frames comprising the moving image.

* * * * *